United States Patent
Inoue et al.

(10) Patent No.: US 8,433,866 B2
(45) Date of Patent: Apr. 30, 2013

(54) REMOTE COPY SYSTEM AND REMOTE COPY CONTROL METHOD IN WHICH A COPY PAIR IS CHANGED FROM A FIRST CONSISTENCY GROUP TO A SECOND CONSISTENCY GROUP (STG)

(75) Inventors: Hironobu Inoue, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 12/673,253

(22) PCT Filed: Oct. 23, 2009

(86) PCT No.: PCT/JP2009/005610
§ 371 (c)(1),
(2), (4) Date: Feb. 12, 2010

(87) PCT Pub. No.: WO2011/048641
PCT Pub. Date: Apr. 28, 2011

(65) Prior Publication Data
US 2011/0167235 A1    Jul. 7, 2011

(51) Int. Cl.
*G06F 13/00*    (2006.01)
(52) U.S. Cl.
USPC .......................................... 711/162; 711/154
(58) Field of Classification Search .................. 711/154, 711/162
See application file for complete search history.

(56) References Cited

U.S. PATENT DOCUMENTS

| 7,330,948 B2 * | 2/2008 | Deguchi et al. ............... 711/162 |
| 2004/0230859 A1 * | 11/2004 | Cochran et al. .................... 714/2 |
| 2005/0102553 A1 * | 5/2005 | Cochran et al. .................... 714/6 |
| 2005/0256972 A1 * | 11/2005 | Cochran et al. ............... 709/245 |
| 2007/0162716 A1 | 7/2007 | Yagisawa et al. |
| 2008/0028172 A1 | 1/2008 | Takahashi et al. |
| 2008/0177964 A1 | 7/2008 | Takahashi et al. |
| 2008/0209146 A1 | 8/2008 | Imazu et al. |
| 2009/0113149 A1 | 4/2009 | Kondo et al. |

FOREIGN PATENT DOCUMENTS

| JP | 2007-188267 A | 7/2007 |
| JP | 2008-33704 A | 2/2008 |
| JP | 2008-181288 A | 8/2008 |
| JP | 2008-209966 A | 11/2008 |
| JP | 2009-104488 A | 5/2009 |
| JP | 2009-199285 A | 9/2009 |
| JP | 2009-217379 A | 9/2009 |

\* cited by examiner

Primary Examiner — Reba I Elmore
(74) Attorney, Agent, or Firm — Mattingly & Malur, PC

(57) ABSTRACT

To provide a remote copy system and the control method for the same capable of performing the setting of volume pairs in the consistency group and changing the setting by the simple operation without depending on the pair definition processing. A copy pair configured of a primary volume and a secondary volume is suspended, and the suspended primary volume and the secondary volume are set to another consistency group different from the original consistency group, and then the primary volume and the secondary volume are resynchronized.

10 Claims, 33 Drawing Sheets

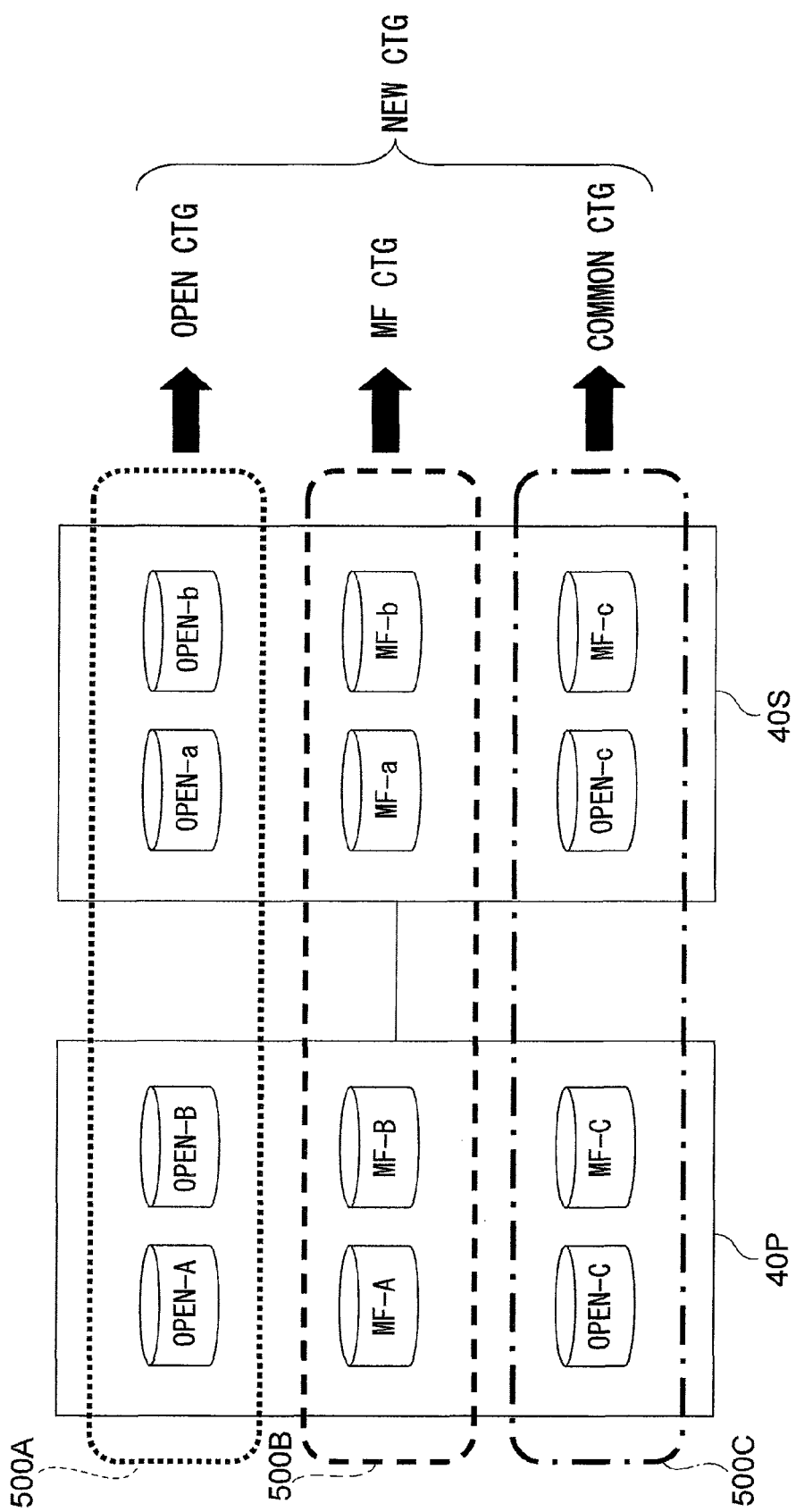

FIG. 6

| VOLUME # (600) | EMULATION TYPE (602) | COPY TYPE (604) | COPY DESTINATION DEVICE (606) | COPY DESTINATION VOLUME # (608) | GROUP OPERATION MODE (610) | GROUP ATTRIBUTE (612) | GROUP # (614) | PAIR STATUS (616) | ... |
|---|---|---|---|---|---|---|---|---|---|
| 0x0000 | MF | SYNCHRONOUS | 12345 | 0x0000 | ON | NEW CTG: COMMON | 0x02 | PAIR | ... |
| 0x0001 | NULL | NULL | NULL | NULL | NULL | NULL | NULL | SMPL | ... |
| 0x0002 | OPEN | SYNCHRONOUS | 12345 | 0x0002 | ON | NEW CTG: OPEN | 0x03 | PAIR | ... |
| 0x0003 | MF | ASYNCHRONOUS | 33567 | 0x0105 | OFF | NULL | NULL | SUSP | ... |
| 0x0004 | OPEN | SYNCHRONOUS | 69215 | 0x0218 | ON | NEW CTG: COMMON | 0x02 | PAIR | ... |
| 0x0005 | MF | SYNCHRONOUS | 12345 | 0x0005 | ON | NEW CTG: | 0x00 | PAIR | ... |
| 0x0006 | MF | SYNCHRONOUS | 12345 | 0x0206 | ON | OLD CTG: MF | 0x02 | PAIR | ... |
| 0x0007 | MF | SYNCHRONOUS | 69215 | 0x020A | ON | OLD CTG: MF | 0x00 | PAIR | ... |
| ... | ... | ... | ... | ... | ... | ... | ... | ... | ... |
| 0xfeff | NULL | NULL | NULL | NULL | NULL | NULL | NULL | SMPL | ... |
| ... | ... | ... | ... | ... | ... | ... | ... | ... | ... |

FIG.7

| GROUP # (614) | GROUP REGISTRATION (700) | GROUP ATTRIBUTE (612) | SUSPEND RECEPTION STATUS (702) |
|---|---|---|---|
| 0x00 | ON | NEW CTG: MF | SUSPEND NOT RECEIVED |
| 0x01 | OFF | NULL | NULL |
| 0x02 | ON | NEW CTG: COMMON | SUSPEND BEING RECEIVED |
| 0x03 | ON | NEW CTG: OPEN | SUSPEND NOT RECEIVED |
| ... | ... | ... | ... |
| 0x7F | NULL | NULL | NULL |

FIG. 8

| GROUP # (614) | I/O HOLD STATUS (800) | I/O HOLD START TIME (802) | TIMEOUT TIME (SECONDS) (804) |
|---|---|---|---|
| 0x00 | I/O HOLD NOT PERFORMED | NULL | NULL |
| 0x01 | I/O ON HOLD | 19:34:18 | 120 |
| 0x02 | NULL | NULL | NULL |
| 0x03 | NULL | NULL | NULL |
| ... | | | ... |
| 0x7F | NULL | NULL | NULL |

FIG.11

```
                Copy Group Attributes (TC)
Command ===>
                                ①
          C/T ID . . . . . .  [7F]      (2-digit Hexadecimal)
          COPY PACE . . . .   NORMAL    (NORMAL or SLOW)
          PROT MODE . . . .   PROTECT   (PROTECT or PERMIT)
          FENCE LVL . . . .   NEVER     (DATA, STATUS or NEVER)
          FREEZE SCP . . .    Y         (N or Y)
          TIMESTAMP . . . .   N         (N or Y)
          DIF UNIT . . . .    CYL       (CYL or TRK)
          OPEN/MF . . . . .  [Y]        (N or Y)
                                ②

F1=Help    F12=Cancel
``` paircreate -g horc0 -fg never 0x7F vl

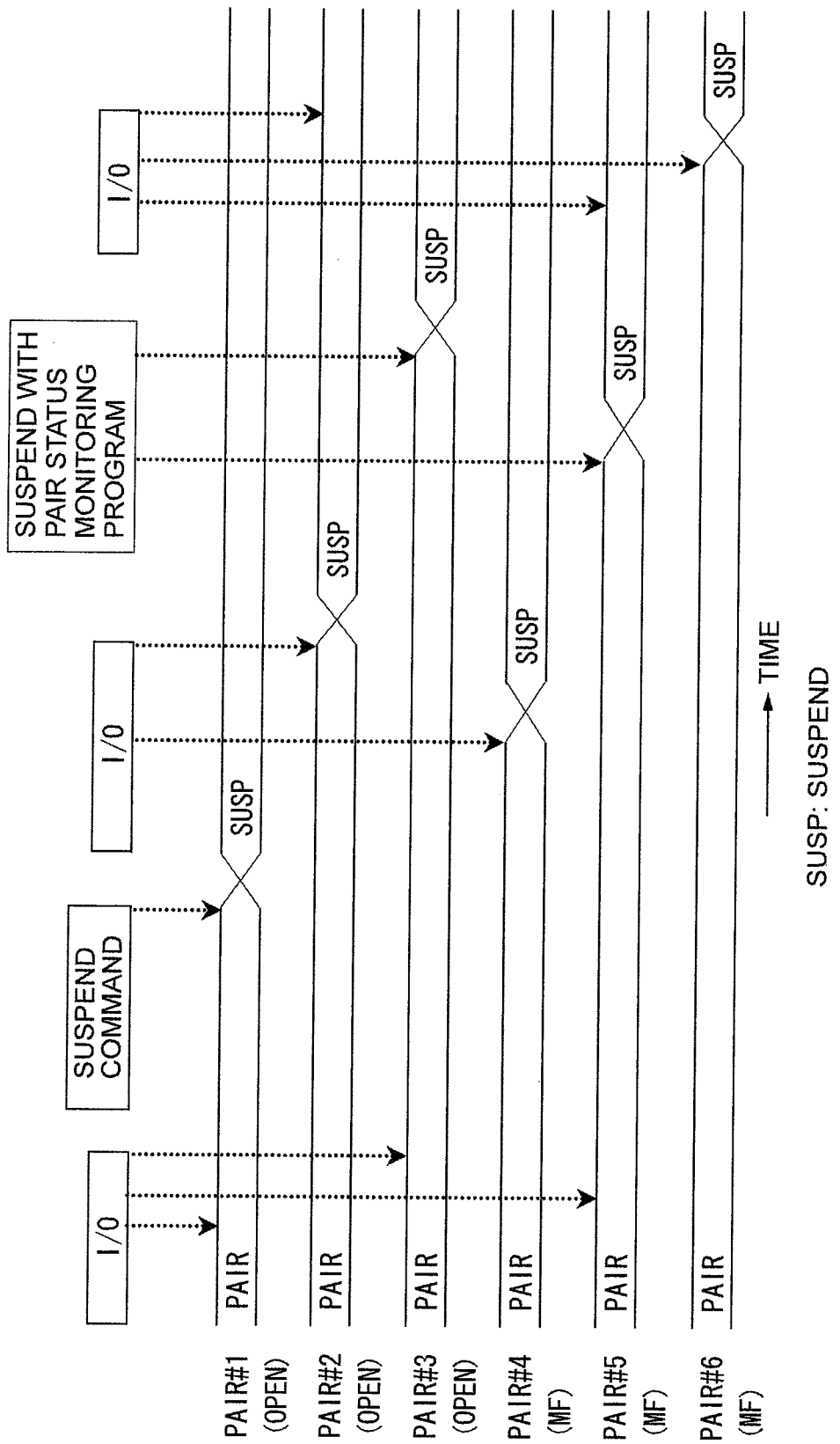

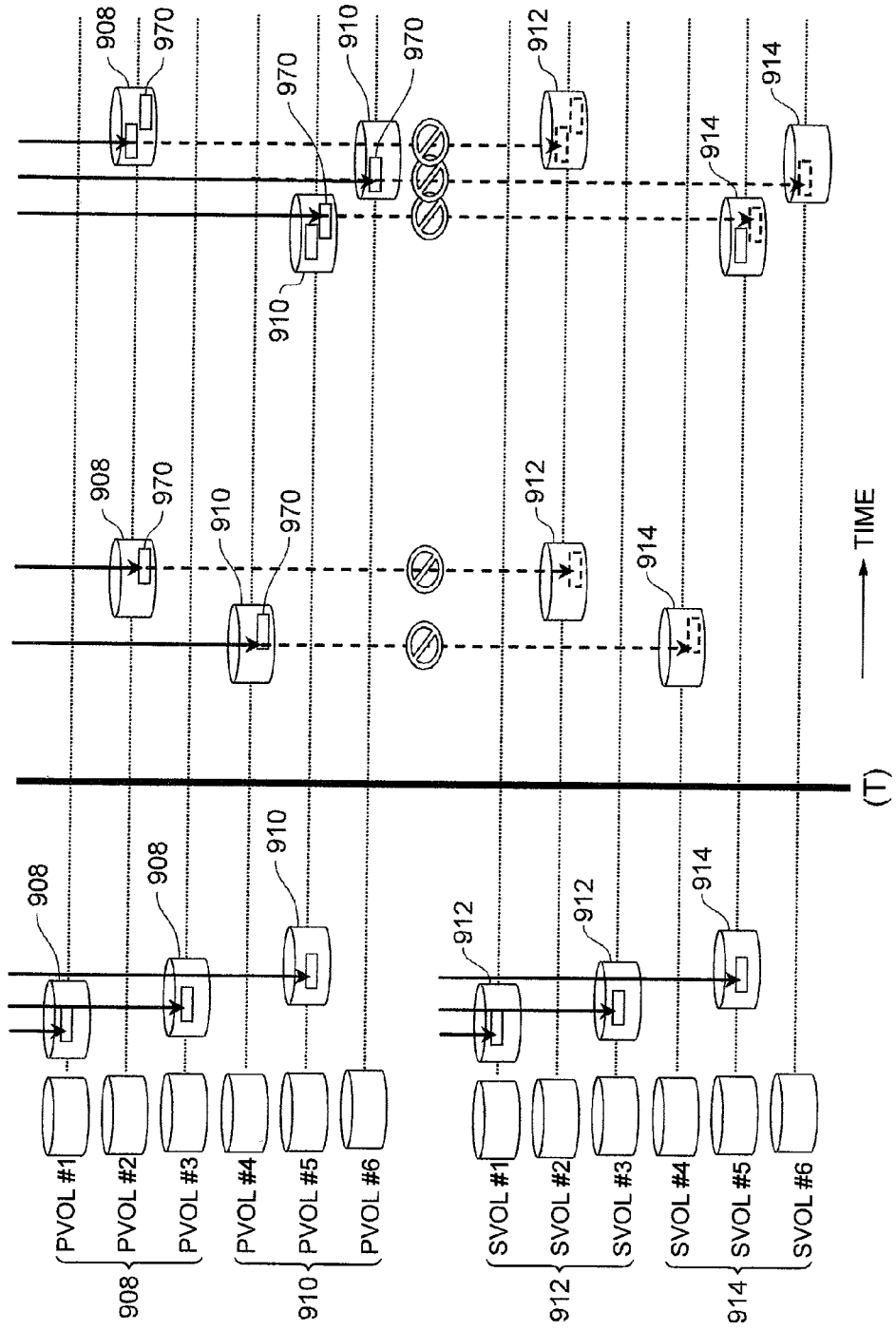

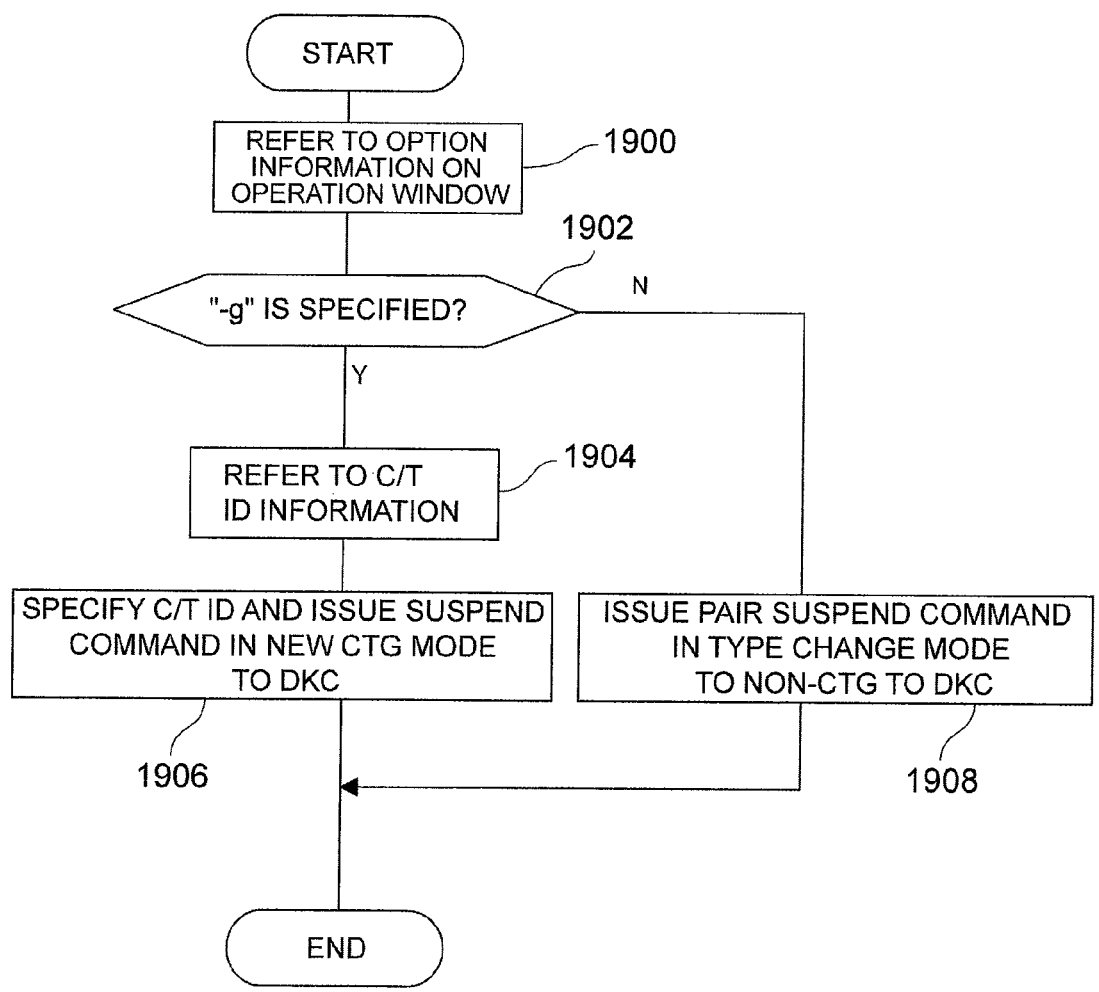

FIG. 25

```
            TC & TCA Copy Group Resync Options
Command ===>

Select resynchronization options:
Copy Group ID  : TC

Direction Option:      Pair Selection:
1  1. As-Is             1  1. All
   2. Forward              2. Conditional
   3. Reverse VolUnit . . . . . . . . . . . . . N
  Overwrite ONLINE target volume . . N
  Update Open/MF . . . . . . . . . . Y   (1)

F1=Help   F12=Cancel
``` pairresync -g horc0 -f g never 0x7f -vl

REMOTE COPY SYSTEM AND REMOTE COPY CONTROL METHOD IN WHICH A COPY PAIR IS CHANGED FROM A FIRST CONSISTENCY GROUP TO A SECOND CONSISTENCY GROUP (STG)

TECHNICAL FIELD

This invention relates to a remote copy system and a remote copy control method, and specifically to a system and a method for better ensuring the assurance of the consistency of backup data for multiple volume pairs.

BACKGROUND ART

As one of the methods for backup processing in the field of storage, volume replication between storage system chassis is known as remote copy.

Recently, in the field of storage, the importance of backup processing continues to increase. On the other hand, in relation to the storage system operation, the demand for operation as a multi-platform on which both open and mainframe volumes can be used is growing.

For example, what is operated on a large scale in financial institutions such as ATMs is a mainframe host whose performance is better than an open host. In comparison, in a configuration targeting PC environments such as the internet banking service, an open host is generally used since the open OS is standard.

Meanwhile, in order to send data processed on the ATM to the user through the internet banking service, the data on the mainframe format must be once converted into the open format.

As for this format conversion processing, the open host entails a problem that the data synchronized with the ATM processing cannot be displayed on the internet banking service, and also faces a problem that the conversion operation is troublesome. Therefore, the backup system capable of maintaining the consistency between the open and mainframe systems is becoming necessary.

As this type of system, for example, the synchronous remote copy system described in Japanese Published Unexamined Patent Application No. 2008-33704 is known. This remote copy system causes the volume pairs used by the open host and the volume pairs used by the mainframe host to coexist in the same volume copy group set between a primary storage system and a secondary storage system, and, if a failure occurs in the remote replication between the primary storage and the secondary storage, concurrently suspends the remote replication for all the multiple volume pairs existing in the copy group so that the replication data whose temporal consistency was maintained is ensured.

CITATION LIST

Patent Literature

[PTL (Patent Literature) 1]
Japanese Published Unexamined Patent Application No. 2008-33704

SUMMARY OF INVENTION

Technical Problem

The conventional remote copy system is able to configure the volume pairs for a consistency group only by pair definitions. By this method, after the remote copy operation is started, the administrator, if attempting to change the setting of volume pairs included in a consistency group such as setting the pairs in the open volume and the mainframe volume in the same consistency group, was required to delete the volume pairs once and then newly define the volume pairs in the consistency group.

This case entails a problem of requiring a heavy workload, for example, backing up all the data from the volumes in the primary storage system to the volumes in the secondary storage system, or taking much time until the remote copy system resumes the assurance of the consistency, and so on.

Furthermore, the conventional remote copy system faces a problem in that, for maintenance or failure recovery for the remote copy system, when terminating remote copy and suspending volume pairs, the I/O processing from the host device had to be terminated for assuring the consistency at the time of maintenance or failures.

Therefore, an object of this invention is to provide a remote copy system and a control method for the same capable of performing the setting of volume pairs in the consistency group and changing the setting by a simple operation without depending on the pair definition processing.

Another object of this invention is to provide a system and a control method capable of rapidly resuming the assurance of the consistency even if the setting of volume pairs in the consistency group is performed or changed.

Another object of this invention is to provide a system and a control method which, even if the volume pairs are suspended, does not require the termination of the I/O processing from the host for assuring the consistency at the time of maintenance or failures in the event of maintenance or failure recovery for the remote copy system, and which can continue the I/O from the host device.

Solution to Problem

In order to achieve the above-mentioned objects, this invention is characterized in providing a remote copy system capable of setting the volume pairs in a specified consistency group when suspending the volume pairs of the primary volume and the secondary volume and then resynchronizing these volumes.

Furthermore, this invention is characterized in providing a remote copy control method in which the remote copy system suspends the volume pairs belonging to the consistency group upon determining an I/O request from the host to the consistency group, and then processes the I/O.

Advantageous Effects of Invention

As described above, according to this invention, it is possible to provide a remote copy system and a control method for the same in which setting of volume pairs in the consistency group and changing the setting can be performed by a simple operation without depending on the pair definition processing.

Furthermore, it is possible to provide a system and a control method which can resume the assurance of the consistency rapidly even if the setting of volume pairs in the consistency group is performed or changed.

Furthermore, it is possible to provide a system and a control method which, even if the volume pairs are suspended, does not require the termination of the I/O processing from the host for assuring the consistency at the time of maintenance or failures in the event of maintenance or failure recovery for the remote copy system, and which can continue the I/O from the host device.

BRIEF DESCRIPTION OF DRAWINGS

FIG. 5 is a block diagram describing consistency groups existing in the remote copy system.

FIG. 6 is a management table of remote copy pairs.

FIG. 7 is a table for managing the consistency groups configured by this invention.

FIG. 8 is a table for managing the consistency groups configured by the conventional technology.

FIG. 11 is a block diagram showing an example of the operation window for creating copy pairs by the pair operation program of the mainframe host.

FIG. 17A is a timing chart describing the control processing performed by the pair status monitoring program and the I/O processing program of the primary storage system for "pair suspend received."

FIG. 17B is a block diagram, corresponding with FIG. 17A, showing the condition of the remote copy between the primary volumes and the secondary volumes.

FIG. 19 is a flowchart describing the pair suspend processing by the pair operation program of the open host.

FIG. 20 is the information on the window for the remote copy pair suspend operation by the pair operation program of the open host.

FIG. 25 is a block diagram of the display window (mainframe host) for the resynchronization processing.

DESCRIPTION OF EMBODIMENTS

Figure 1:
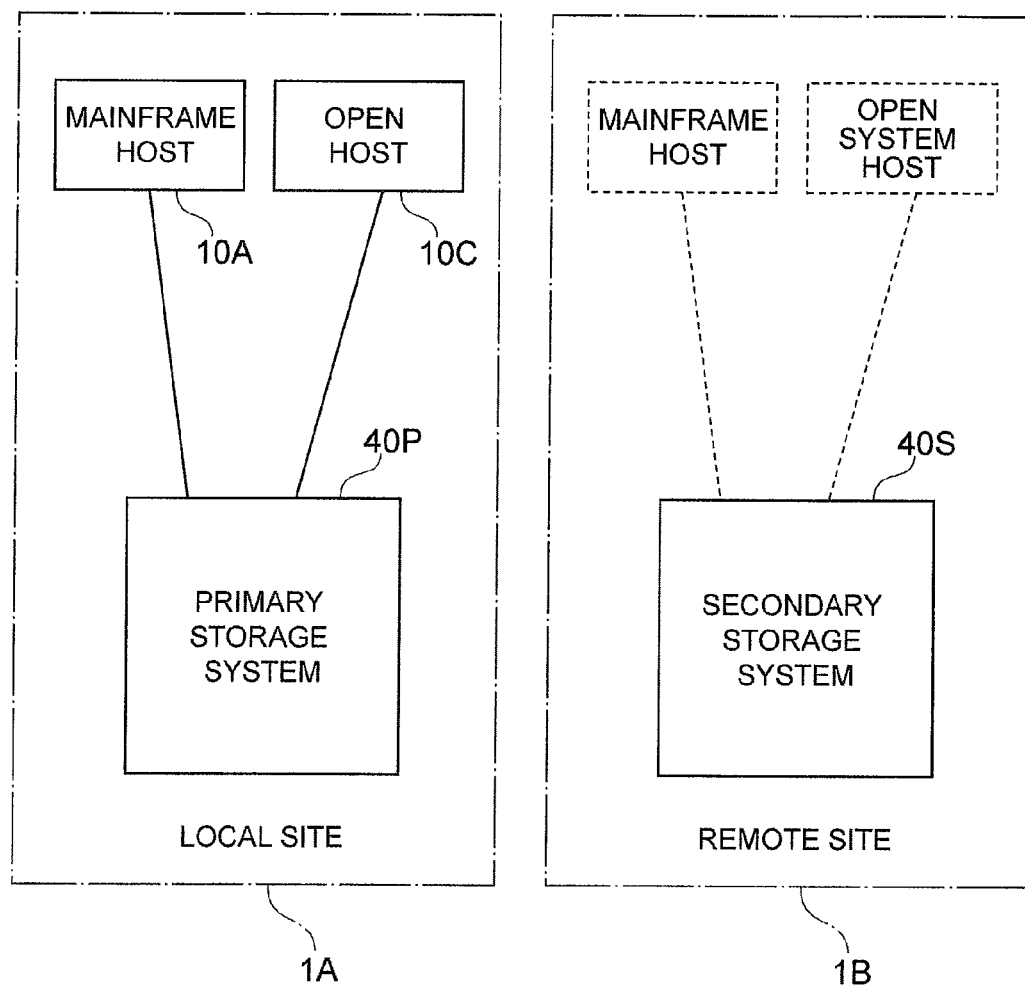
FIG. 1 is a hardware block diagram related to an embodiment of the remote copy system and the control method for the same related to this invention.

An embodiment of the remote copy system and the control method for the same related to this invention is now described with reference to the attached drawings. FIG. 1 is a hardware block diagram showing an overview of the system. The system comprises a local site 1A and a remote site 1B.

The local site 1A comprises a primary storage system 40P, and a mainframe host (mainframe server) 10A and an open host (open server) 10C connected to the primary storage system 40P.

The primary storage system 40P and the mainframe host 10A are connected in accordance with a mainframe communication method, such as ESCON (Enterprise Systems Connection) (registered trademark) or FICON (Fiber Connection) (registered trademark).

The primary storage system 40P and the open host 10C are connected in accordance with an open communication method, such as iSCSI (Internet Small Computer System Interface) or Fibre Channel.

The remote site 1B comprises a secondary storage system 40S connected to the primary storage system 40P. To the secondary storage system 40S, a mainframe host and/or an open system host may also be connected.

Figure 2:
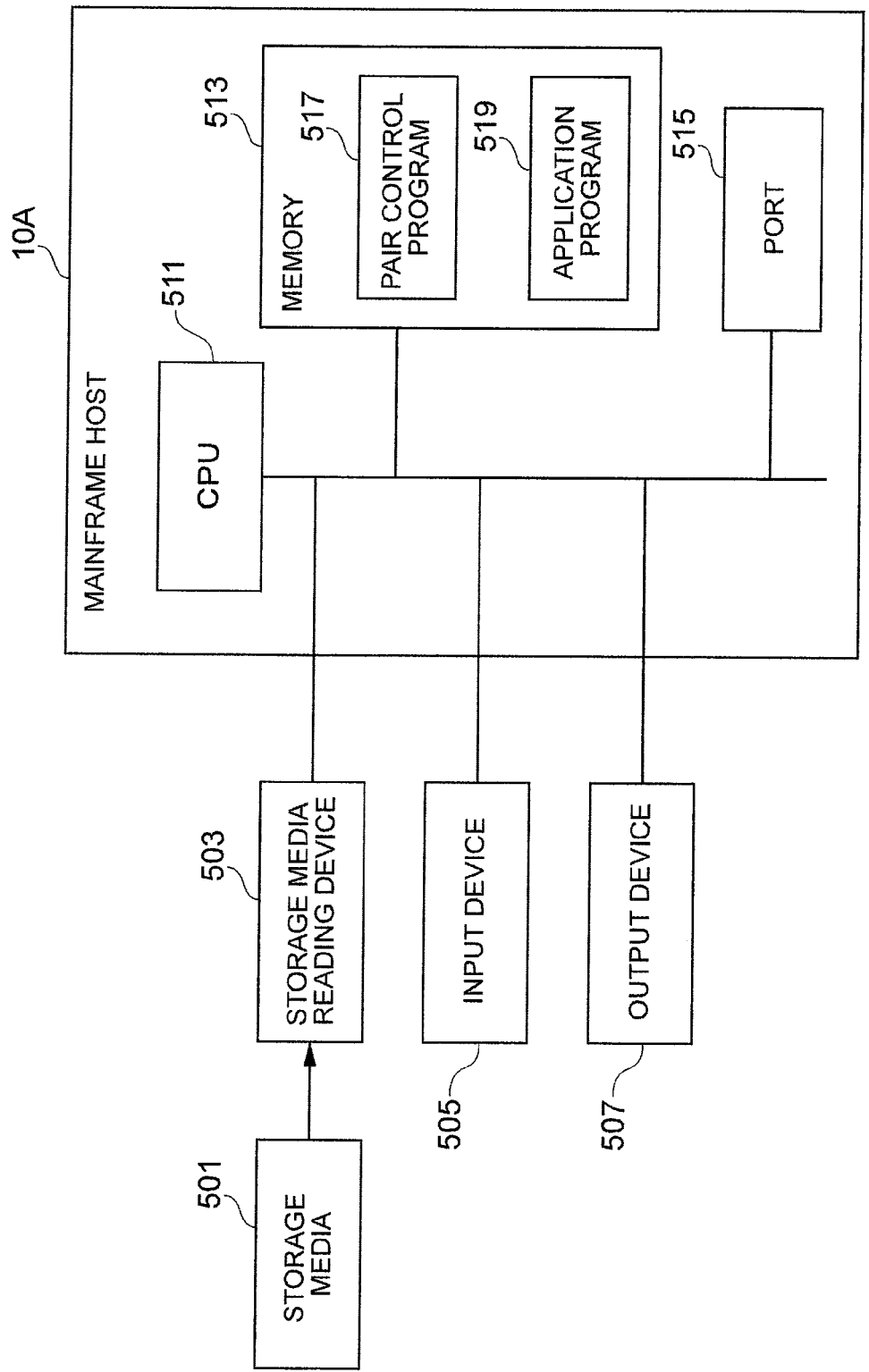
FIG. 2 is a hardware block diagram of the mainframe host.

FIG. 2 shows a hardware block diagram of the mainframe host among these hosts. The mainframe host 10A comprises a CPU 511, a memory 513, a communication port 515 for communication with the storage system, an input device 505 such as a keyboard, an output device 507 such as a display device, and a storage media reading device 503 for reading data from a storage media 501. The configuration of the open host 10C is basically the same.

The memory 513 comprises, as computer programs, a pair operation program 517 for controlling the primary storage system 40P, an application program 519 for performing the specified operation, and an OS. The CPU 511 executes these computer programs. The I/O from the host to the storage system is output from the application program 519.

Figure 3:
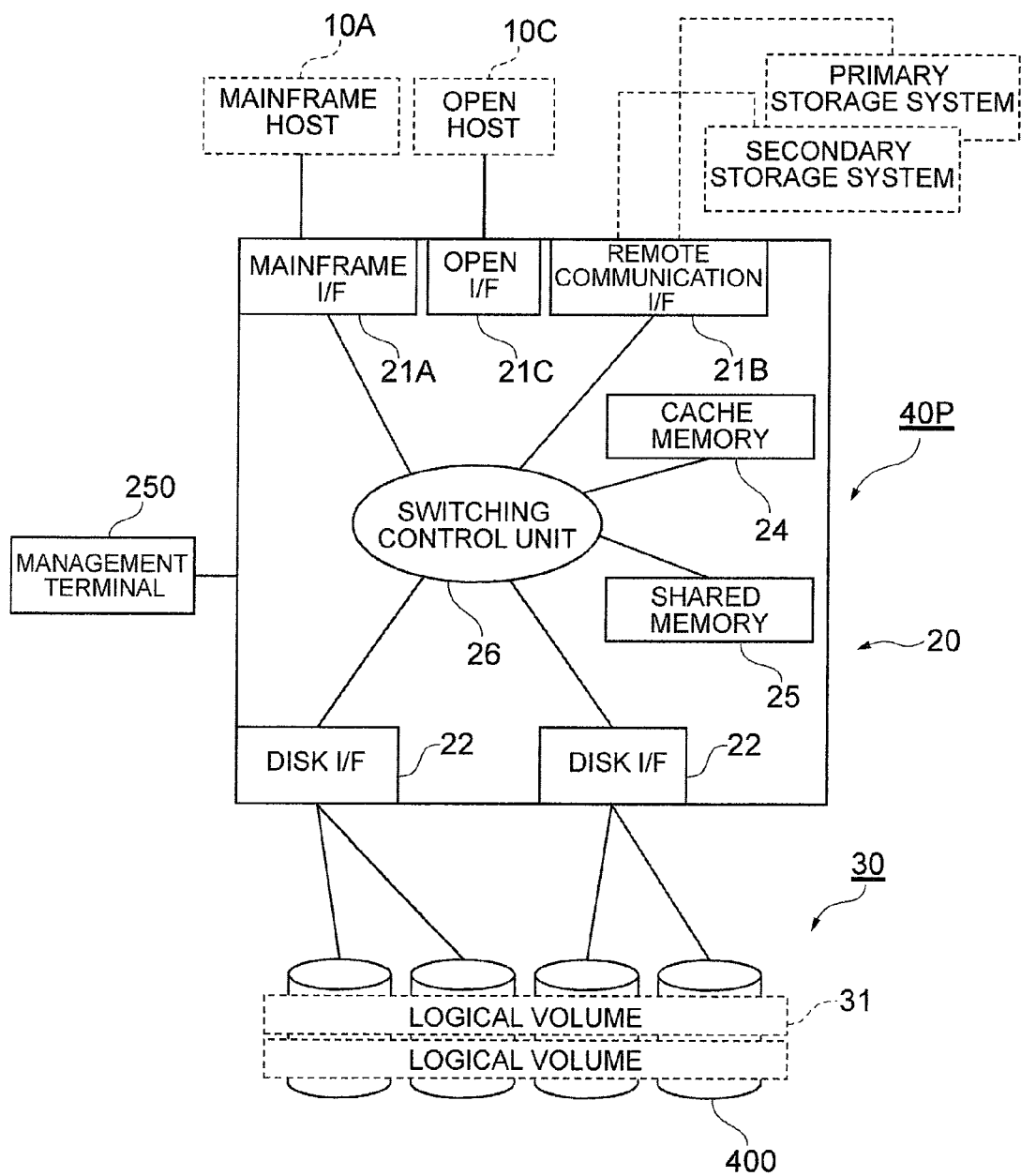
FIG. 3 is a hardware block diagram of the primary storage system.

FIG. 3 is a hardware block diagram of the primary storage system 40P. The primary storage system 40P is configured of, for example, a RAID (Redundant Array of Independent (or Inexpensive) Disks) system comprising a large number of disks 400 in the array configuration.

The primary storage system 40P comprises a controller unit 20 and a disk unit 30. The controller unit 20 comprises, for example, multiple interface control devices (I/Fs) 21A to 21C, a cache memory 24, a shared memory 25, and a switching control unit 26.

The storage system comprises, as multiple interface control devices, a host I/F 21A for the mainframe (e.g. a channel control unit), a host I/F 21C for the open system, a remote communication I/F 21B for other storage systems, and I/Fs 22 with the disks 400. To the controller unit 20, a management terminal 250 for managing the storage system 40P is connected. The respective I/Fs are devices for controlling the communication with the connection destinations and have practically the same hardware configuration.

Figure 4:
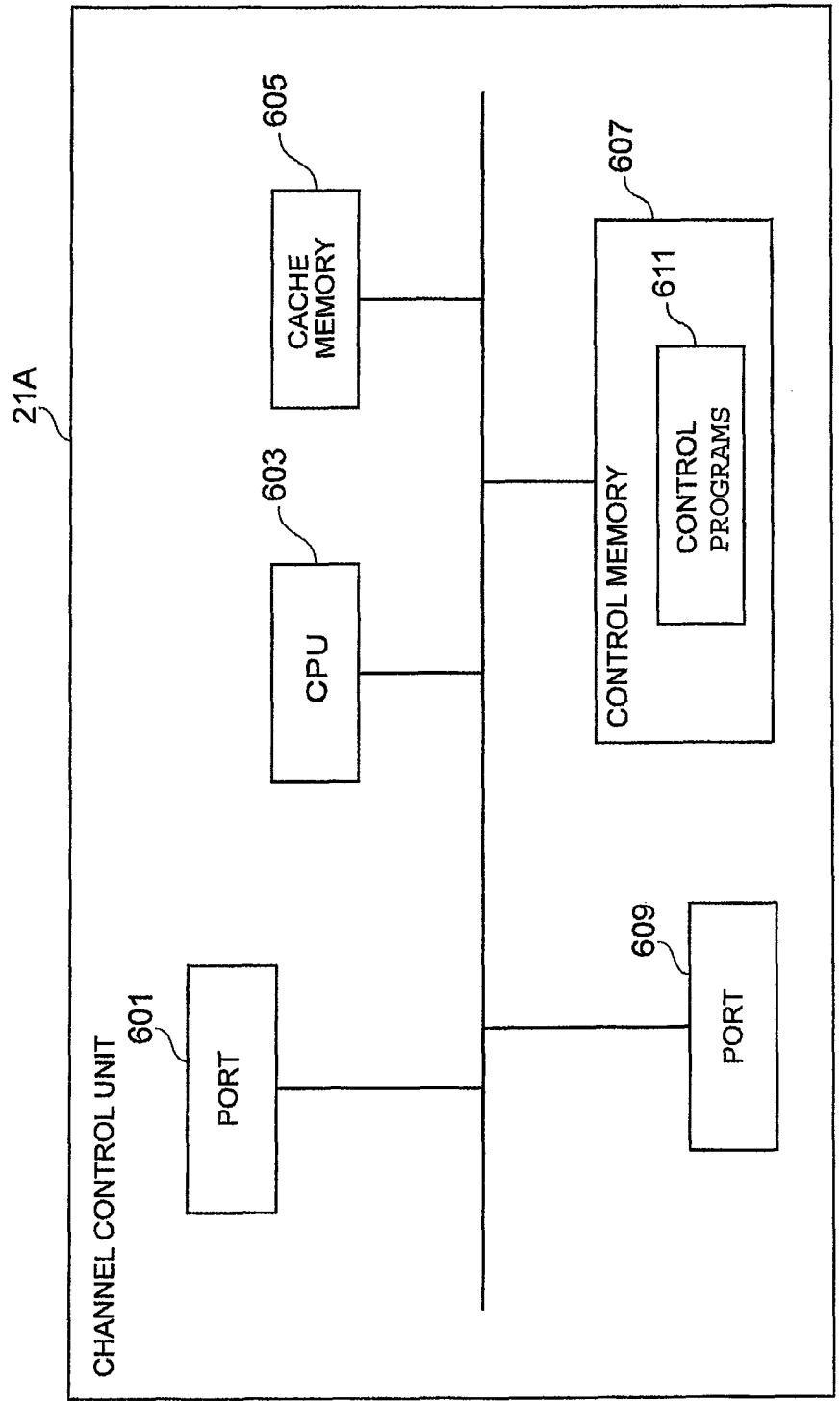
FIG. 4 is a hardware block diagram of the mainframe interface.

FIG. 4 shows the hardware configuration of the mainframe I/F 21A as a representative I/F. The mainframe I/F 21A comprises a port 601 for communicating with the mainframe host 10A, a port 609 for connecting to the switching control unit 26, a cache memory 605 for temporarily storing the data which is sent and received, a control memory 607 for storing control programs 611, and a CPU 603 for performing the control programs 611.

The control programs 611 are stored in the mainframe I/F 21A, the open I/F 21C, and the remote communication I/F 21B, respectively. The control programs 611 stored in the mainframe I/F 21A and the open I/F 21C are the I/O processing programs for processing I/O commands (write commands or read commands) from the host.

On the other hand, the control programs 611 stored in the remote communication I/F 21B are a remote copy program for performing remote copy, a pair operation program for operating volume pairs, a failure monitoring program for monitoring storage system failures and performing processing with reference to the monitoring results, and a volume pair status monitoring program. These control programs may also exist in the shared memory.

The cache memory 24 of the storage system is, for example, a volatile or non-volatile memory and temporarily stores the data received from the hosts 10A and 10C or read from the disks 400.

The shared memory 25 is, for example, a volatile or non-volatile memory and stores the information related to the control in the primary storage system 40P. The shared memory 25 and the cache memory 24 may also be one memory including a shared memory area and a cache memory area.

The switching control unit 26 is a device for mutually connecting the respective I/Fs 21A to 21B, and 22, the cache memory 24, and the shared memory 25, and comprises, for example, a high-speed bus such as an ultrafast crossbar switch for performing data transmission by a high-speed switching operation.

The disk unit 30 comprises multiple disks 400 configured in an array. The embedded disks 400 are disk storage devices, for example, hard disks, flexible disks, optical disks and others. Instead of the disks 400, other types of storage devices, for example, magnetic tapes and semiconductor memories such as flash memories can also be used.

The controller unit 20 creates a RAID group with reference to the multiple disks 400, divides these into multiple areas, and provides the divided areas to the host, as logical volumes 31. The logical volumes are mainframe volumes used by the mainframe host, open volumes used by the open host, and shared volumes used by both of the hosts.

To the remote communication I/F 21B, the secondary storage system 40S is connected. Another primary storage system may also be connected. On the controller unit 20, the remote communication I/F connected to the secondary storage system 40S and the remote communication I/F connected to the other primary storage system may also be separately installed. The secondary storage system 40S can also be connected to the remote communication I/F 21B while the other primary storage system is connected by a dedicated line via a specified I/F which is not shown in the drawings.

The secondary storage system 40S comprises basically the same configuration as the primary storage system 40P. The logical volumes of the secondary storage system are referred to as secondary volumes and are distinguished from the logical volumes of the primary storage system (primary volumes). The secondary volumes are the replication volumes of the primary volumes.

A pair relationship exists between a primary volume and a secondary volume and, if the host makes a write access to the primary volume, the synchronous remote copy for the write data is performed for the paired secondary volume.

One or more pairs of primary volumes and secondary volumes configure a copy group, and the remote copy system assures the consistency of the copy group to the host computer. The assurance of the consistency indicates the function of assuring that, among the multiple secondary volumes existing in the same copy group, the replication is consistent in temporal sequence. The copy group whose consistency is assured is a consistency group.

FIG. 5 is a block diagram describing the attributes of the consistency groups existing in the above-mentioned remote copy system, and 500A is an open consistency group (OPEN CTG) configured of multiple open volumes of the primary storage system 40P and multiple open volumes of the secondary storage system 40S. In this consistency group, an open volume OPEN-A in the primary storage system and an open volume OPEN-a in the secondary storage system are a volume pair while, similarly, an open volume OPEN-B and an open volume OPEN-b are a volume pair.

500B is a mainframe consistency group (MF CTG) configured of multiple mainframe volumes of the primary storage system 40P and multiple mainframe volumes of the secondary storage system 40S. In this consistency group, a mainframe volume MF-A in the primary storage system and a mainframe volume MF-a in the secondary storage system are a volume pair while, similarly, a mainframe volume MF-B and a mainframe volume MF-b are a volume pair.

500C is a consistency group configured of an open volume and a mainframe volume of the primary storage system 40P and an open volume and a mainframe volume of the secondary storage system 40S.

In this consistency group, an open volume OPEN-C in the primary storage system and an open volume OPEN-c in the secondary storage system are a volume pair while, similarly, a mainframe volume MF-C and a mainframe volume MF-c are a volume pair.

The consistency group 500C assures the consistency for multiple volumes of different emulation types and is classified as a "common CTG" to be distinguished from the consistency group assuring the consistency for the open volumes (OPEN CTG) and the consistency group assuring the consistency for the mainframe volumes (MF CTG).

The open consistency group (OPEN CTG), the mainframe consistency group (MF CTG), and the open-mainframe consistency group (common CTG) are used for solving the above-mentioned problems and classified as "new CTGs" to be distinguished from the conventional consistency groups. On the other hand, the latter consistency groups are classified as "old CTGs."

The open host 10C recognizes the open volume pair of the consistency group 500A as the open volumes of the OPEN CTG, and the mainframe host 10A recognizes the mainframe volume pair of the consistency group 500B as the mainframe volumes of the MF CTG. Furthermore, the open host recognizes the open volume pair of the consistency group 500C as the open volumes of the common CTG while the mainframe host recognizes the mainframe volume pair of the consistency group 500C as the mainframe volumes of the common CTG.

FIG. 6 is a management table of remote copy pairs, where the management information of the copy pairs is recorded in units of primary volumes.

The volume # (600) in the remote copy pair management table is information for identifying the primary volumes. The emulation type (602) is information for determining whether the emulation type of each volume is mainframe (MF) or open (OPEN). The copy type (604) is information for determining whether the remote copy is synchronous or asynchronous. To the copy destination device (606), the identification information of the secondary storage system is registered. To the copy destination volume # (608), the identification information of the secondary volumes is registered.

The group operation mode (610) is information for determining whether a copy group configured of a volume # (600) and a copy destination volume # (608) operates as a consistency group (ON) or does not operate as a consistency group (OFF).

The group attribute (612) is information for determining whether a consistency group whose group operation mode is ON is, as shown in FIG. 5, classified as a "new CTG" or an "old CTG," and whether the attribute of the former is "OPEN," "MF," or "common." "Old CTG: MF" indicates that the consistency of the mainframe volume is assured by the conventional technology. That is, the "old CTG: MF" is a consistency group that is affected by the above-mentioned problems. The remote copy system in FIG. 5 may also be the conventional system configured of the conventional consistency groups to which the functions of the "new CTGs" are added.

The functions of the "new CTGs" indicate that at least one of the following can be achieved: the setting of volume pairs in the consistency group and changing the setting can be performed by the simple operation without depending on the pair definition processing, wherewith, even if the setting of volume pairs in the consistency group is performed or changed, the assurance of the consistency can be resumed rapidly, and wherewith, in the event of maintenance or failure recovery for the remote copy system, even if the volume pairs are suspended, the termination of the I/O processing from the host for assuring the consistency at the time of maintenance or failures is not required, and the I/O from the host device can be continued.

The group # (614) is an identification number (C/T ID) of the consistency group to which a pair configured of a volume # (600) and a copy destination volume # (608) belongs. The pair status (616) is a pair status of a pair configured of a volume # (600) and a copy destination volume # (608). "PAIR" indicates that synchronous remote copy is being performed between both volumes and that the data of the secondary volume is consistent with the primary volume.

Suspend (SUSP) indicates a status where the pair between the primary volume and the secondary volume is split. Note that the pair relationship between the volumes is maintained. "SMPL" indicates that the two volumes are not in a pair relationship but are respectively operated as individual volumes.

FIG. 7 is a table for managing the "new CTGs" (FIG. 5), where the management information of the copy groups is recorded in units of copy group # (614). This management table includes the group # (614), the group registration (700), the group attribute (612), and the suspend reception status (702). The group registration (700) is information for determining whether a consistency group is in operation ("ON") in operation ("OFF").

The suspend reception status (702) is related to the status on how a "new CTG" receives "suspend," which is either "suspend not received" or "suspend being received."

The "suspend reception status" is set for the copy group by the trigger of the suspend of the operation from the host device to the primary storage system or a failure suspend when the monitoring program of the primary storage system determines the failure.

FIG. 8 is a management table for the old MF CTGs. To this table, the I/O hold status (800), the I/O hold start time (802), and the timeout time (804) are registered in units of synchronous remote copy group # (614).

The I/O hold status (800) is either "I/O on hold" or "I/O hold not performed." To the I/O hold start time (802), the time when the I/O hold status started is registered. To the timeout time (804), the time when the timeout is determined is registered. If the I/O processing program determines that the timeout time (for example, 120 seconds) has passed since the I/O hold start time, the control information forces the change of the I/O hold status from "I/O on hold" to "I/O hold not performed."

The "I/O hold status" is the status in which the primary storage system does not inhibit the reception of write commands but does not perform any write commands. For example, in the I/O hold status, if the primary storage system receives a write command, by returning a specific response (for example, busy or a retry request) to the host device, it reports that the primary storage system will receive the write command again to the host device which issued the write command.

The controller unit 20 of the primary storage system 40P, with reference to the control commands from the pair operation program of the mainframe host 10A and/or the open host 10C or in accordance with the control processing of the pair operation program of the primary storage system, registers the management information in the management tables shown in FIG. 6 to FIG. 8 or updates the management information.

These management tables are registered in the shared memory 25. The primary storage system 40P, via the remote communication I/F, sends information of these management tables to the secondary storage system 40S.

The host, for acquiring the CTG attributes, issues a reference command to the storage system. The storage system receiving this command sends the information of the above-mentioned management tables, at least the information in FIG. 6, to the host. The host, with reference to the management information, recognizes the management information such as the CTG attributes, the volume pair status, and so on. The storage system may also send the management information as the status to be displayed in the host.

An example of the operation procedure of the remote copy system is now described with reference to FIG. 9. When starting the remote copy operation, the system administrator, between the primary volumes of the primary storage system 40P (open volume: 908, mainframe volume: 910) and the secondary volumes of the secondary storage system 40S (open volume: 912, mainframe volume: 914), defines the respective volume pairs, and sets a consistency group 500C ("common CTG").

The pair operation program of the open host (RAID MANAGER: RM (902)) issues to the pair operation program of the primary storage system a pair creation command for creating an open volume pair in the consistency group 500C which is a "common CTG."

Then, the pair control program of the mainframe host (BCM (906)) issues to the pair operation program of the primary storage a pair creation command for creating a mainframe volume pair in the consistency group which is a "common CTG."

The pair operation program of the primary storage system registers the volume pair information in the remote copy pair management table (FIG. 6) and the CTG management table (FIG. 7). The pair operation program registers "PAIR" to the pair status of the copy group in the remote copy pair management table (FIG. 6). The pair operation program registers "suspend not received" to the suspend reception status in the CTG management table (FIG. 7).

Figure 9:
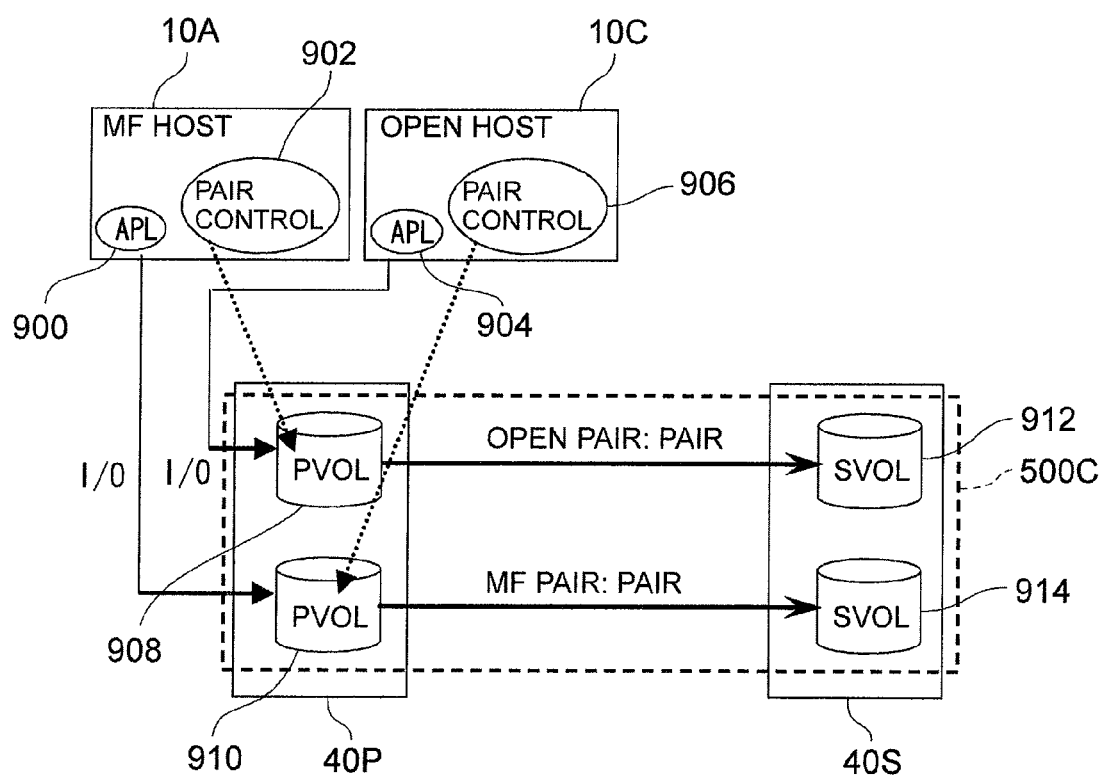
FIG. 9 is a block diagram related to an example of the operation procedure of the remote copy system.

According to FIG. 9, the remote copy system, when starting the remote copy operation, for setting volume pairs in the consistency group, defines the mainframe volume pairs and the open volume pairs in the consistency group 500C (FIG. 5) with the attribute of a "common CTG." Note that the remote copy system, as obvious from FIG. 5, may also set the mainframe volume in the consistency group 500B as an "MF CTG" and set the open volume in the consistency group 500A as an "OPEN CTG."

After the remote copy operation is started, upon receiving a pair creation command from the host device, the pair operation program may also add an open volume pair to the "MF CTG" consistency group 500B (FIG. 5) and change the attribute of the consistency group from "MF CTG" (500B) to "common CTG" (500C).

On the other hand, the pair operation program may also add a mainframe volume pair to the "OPEN CTG" consistency group 500A and change the attribute of the consistency group from "OPEN CTG" (500A) to "common CTG" (500C).

Furthermore, it may also delete the mainframe volume pair from the "common CTG" consistency group 500C and change the attribute of the consistency group from "common CTG" to "OPEN CTG" (500A). It may also delete the open volume pair from the "common CTG" consistency group and change the attribute of the consistency group from "common CTG" to "MF CTG" (500B).

The methods of adding volume pairs to a consistency group classified as a "new CTG" includes, as well as adding a new volume pair, adding the volume pair which was operated as a "new CTG." The latter method includes, for example, adding a volume pair of the "MF CTG" to the "OPEN CTG" consistency group, adding a volume pair of the "OPEN CTG" to the "MF CTG" consistency group, or adding a volume pair of the "MF CTG" and/or a volume pair of the "OPEN CTG" to the consistency group of "common CTG." Furthermore, the pair operation program may also add a volume pair of an "old CTG" to the "new CTG."

If the pair operation program creates a volume pair in accordance with the latter method, it is possible to once suspend the multiple volume pairs belonging to the consistency group to which the volume pair is added and the consistency group including the volume pair to be added, and when resynchronizing the suspended volume pair, to set the volume pair in the intended "new CTG" consistency group.

The method by which the primary volume and the secondary volume in the pair relationship in the consistency group are suspended, and then the suspended pair of volumes is resynchronized, by which the assurance of the consistency is resumed is, for example, applied to maintenance backup in the remote copy system and to failure backup.

Figure 10:
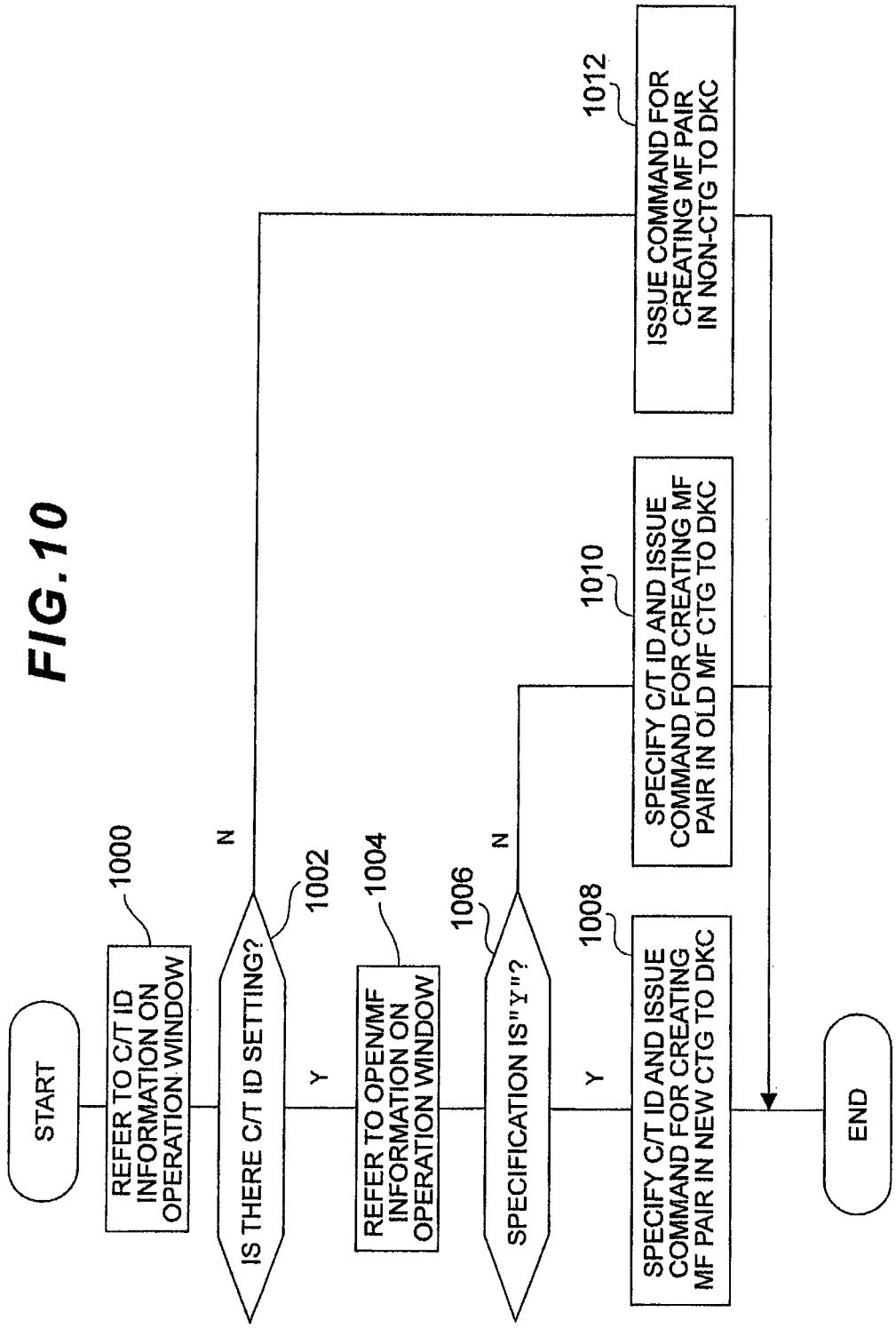
FIG. 10 is a flowchart describing the processing of the pair creation program of the mainframe host.

This pair creation processing is described in detail below with reference to the flowcharts. FIG. 10 is a flowchart describing the processing of the pair control program of the mainframe host, and FIG. 11 is a block diagram showing an example of an operation window for creating copy pairs by the pair control program of the mainframe host.

Note that, in the description of the flowcharts, the programs are referred to as the subjects for convenience, but actually, the controller such as an MPU executing the programs performs the flowcharts.

The pair control program refers to the C/T ID input in the operation window (consistency group ID information: (1) in FIG. 11) (1000), and determines whether the setting of the C/T ID exists (1002). If this is affirmed, the program refers to OPEN/MF information (2) of the operation window (FIG. 11) (1004), and determines whether "Y" is specified (1006). If this is affirmed, the program specifies the C/T ID and issues a command specifying the creation of a mainframe volume pair (MF pair) in the consistency group with the attribute "new CTG" to the primary storage system (DKC) (1008).

On the other hand, if it is determined that the setting of the C/T ID does not exist (step 1002: "NO"), the program issues a command for creating a mainframe volume pair in the group which does not assure consistency (non-CTG) to the DKC (1012). Furthermore, if it is determined that the OPEN/MF input information is not "Y" (step 1006: "NO"), the program specifies the C/T ID, and issues a command specifying the creation of a mainframe volume pair in the consistency group with the attribute "old MF CTG" to the DKC (1010).

Figures 12, 13:
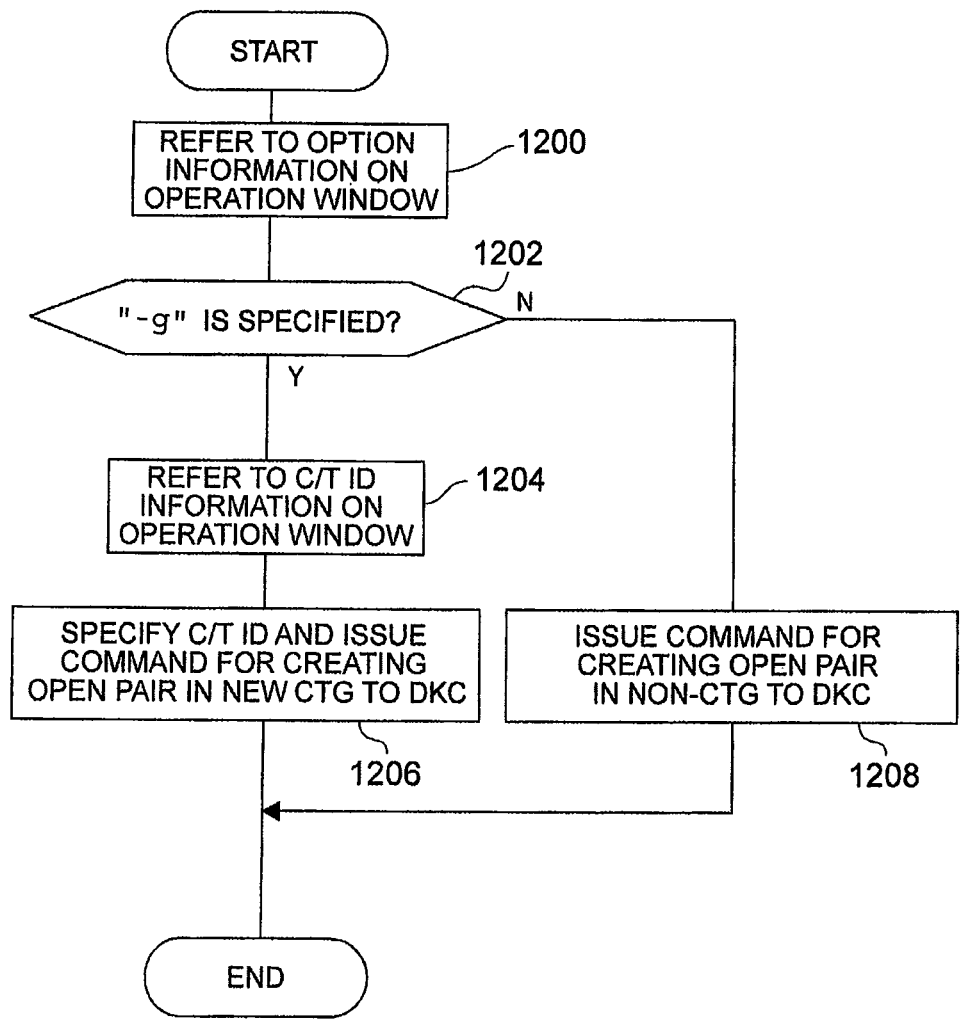
FIG. 12 is a flowchart describing the processing of the pair creation program of the open host.
FIG. 13 is an example of the operation window for creating copy pairs by the pair operation program of the open host.

FIG. 12 describes the processing of creating volume pairs by the pair control program of the open host, and FIG. 13 is an example of the operation window for creating volume pairs by the pair control program of the open host.

The pair control program refers to the option information input in the operation window (FIG. 13) (1200), and determines whether "-g" exists in the specified field of the option information (1202). If this determination is affirmed, the program refers to the C/T ID information in the operation window (1204).

Next, the program specifies the C/T ID, and issues a command for creating an open volume pair in the consistency group classified as a "new CTG" to the DKC (1206). On the other hand, if it is determined that "-g" does not exist in the option information, the program issues a command for creating an open volume pair in the copy group which does not assure consistency (non-CTG) to the DKC (1208).

Figure 14:
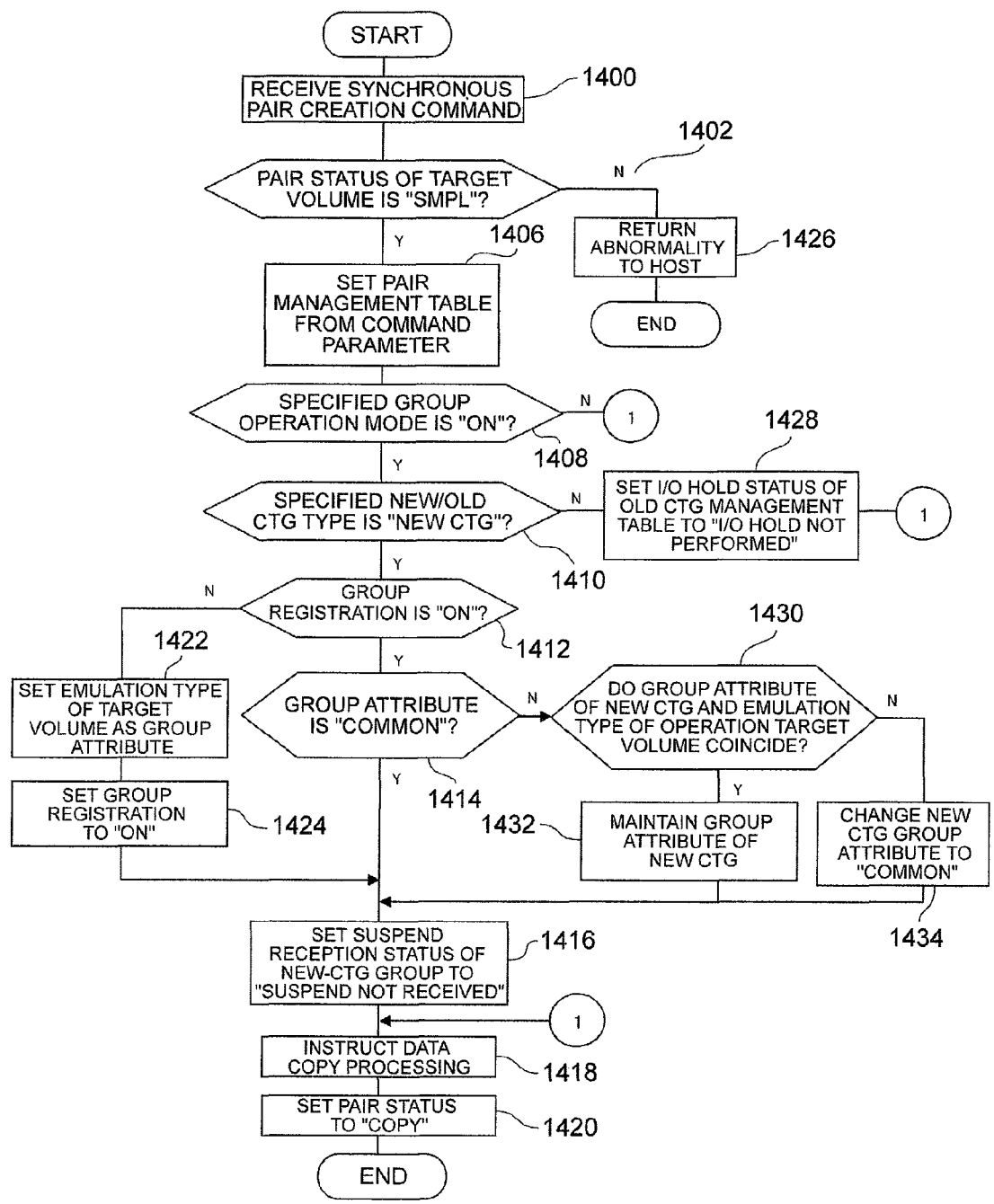
FIG. 14 is a flowchart describing the operation of the pair operation program of the primary storage system which has received a pair creation command from the mainframe host and/or the open host.

FIG. 14 is a flowchart describing the operation of the pair operation program of the primary storage system which has received a pair creation command from the mainframe host and/or the open host.

In the parameters of the pair creation command from the host device, an operation target volume #, a copy type, a copy destination device #, a copy destination volume #, a group operation mode, a new/old CTG type, and a C/T ID exist.

The host device issues a reference command to the primary storage system for acquiring the information required for the parameters included in the pair creation command.

The pair operation processing program of the DKC, upon receiving a command for creating a volume pair of synchronous remote copy from the host device (1400), checks the pair status of the pair of the primary volume and the secondary volume as the target of the pair creation command with reference to the management table (FIG. 6) (1402). The program, upon determining that the pair status of the target volumes is not "SMPL (SIMPLEX)," returns abnormality to the host device as the pair cannot be set in the target volume (1426).

On the other hand, if it is determined that the pair status of the target volumes is "SMPL," the information included in the command parameter is registered in the pair management table (FIG. 6) (1406). However, the group attribute and the pair status are, with reference to the processing of steps described later, registered in the management table.

Next, the program checks whether the group operation mode specified by the command parameter is "ON" (1408). The pair operation program, upon determining that this is not "ON," considering that it is not necessary to control the copy group as a consistency group, immediately instructs the data copy program to copy data from the primary volume to the secondary volume (1418).

On the other hand, the pair operation program, upon determining that the result of step 1408 is "ON," determines whether the attribute or type of the consistency group specified by the command parameter is "new CTG" (1410). If the attribute or type is determined not to be "new CTG," the program jumps to step 1418 and the I/O hold status of the old CTG management table (FIG. 8) is set to "I/O hold not performed" (1428).

The pair operation program, upon determining that the attribute or type is "new CTG," refers to the management table in FIG. 7, and determines whether the "group registration" (700) in the C/T ID (group #: 614) specified by the command parameter is "ON." If this is determined not to be "ON," as no volume pair is set in this group #, the emulation type of the target volume (mainframe (MF) or OPEN) is set in the "group attribute" (612) (1422). Furthermore, for "group registration," "ON" is set (1424).

On the other hand, the program, upon determining that the group registration is "ON" ("YES" at step 1412), as the volume pair is already registered to the C/T ID specified by the command parameter, when the volume pair specified by the command parameter is added to the consistency group, determines whether to change the group attribute.

Therefore, the pair operation program refers to the consistency group management table (FIG. 7), and checks the group attribute of the C/T ID specified by the command parameter (1414). If the group attribute is determined to be common ("YES" at step 1414), as the group attribute is not changed whether the emulation type of the target volume is mainframe or open, the program proceeds to the next step (1416) without performing the steps for changing the group (1430 to 1434).

On the other hand, if the group attribute is not "common," because it is necessary to change the group attribute as the target volume is added to the group # specified by the command parameter, the pair operation program compares the group attribute (emulation type) (612) of the new CTG with the emulation type of the target volume (1430).

If it is determined that the emulation types do not coincide ("NO" at step 1430), that is, if the group attribute of the "new CTG" is "MF" while the emulation type of the target volume is "OPEN" or vice versa, as adding the target volume pair to the "new CTG" results in the mixture of both of the emulation types in the "new CTG," the group attribute must be changed to "common" (1434). The remote copy system, for the consistency group to which the group attribute "common" is registered, maintains the consistency among multiple volume pairs of different emulation types.

On the other hand, if the emulation types coincide ("YES" at step 1430), that is, if the group attribute of the "new CTG" is "MF" and the emulation type of the target volume is "MF," or if the group attribute of the "new CTG" is "OPEN" and the emulation type of the target volume is "OPEN," the group attribute of the "new CTG" is maintained (1432).

Then, the pair operation program sets the suspend reception status of the new CTG management table to "suspend not received" indicating that the status is not suspend (1416). Furthermore, the pair operation program instructs the data copy program to copy all the data from the primary volume which is the target volume to the secondary volume.

Then, in the remote copy management table (FIG. 6), to the pair status (616) corresponding with the target volume # (600), the program registers "COPY" indicating that all the data in the primary volume is being copied to the secondary volume (1420).

Figure 15:
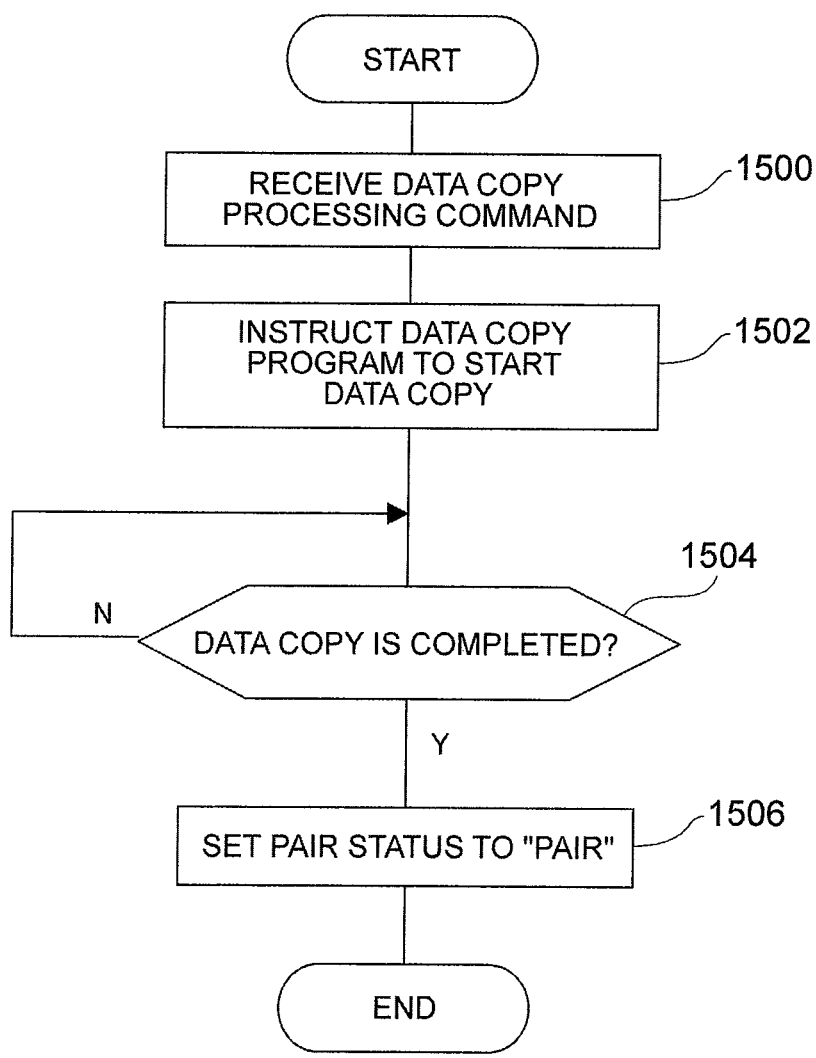
FIG. 15 is a flowchart showing the operation of the pair status monitoring program.

FIG. 15 is a flowchart showing the operation of the pair status monitoring program. The pair status monitoring program, upon receiving a data copy instruction from the pair operation program (1500), instructs the data copy program of the remote copy program to start data copy (1502). Then, when the completion of the data copy is determined (1504), the program changes the pair status (616) of the remote copy pair management table (FIG. 6) from "COPY" to "PAIR" indicating that the data in the primary volume and the data in the secondary volume are synchronized.

Figure 16:
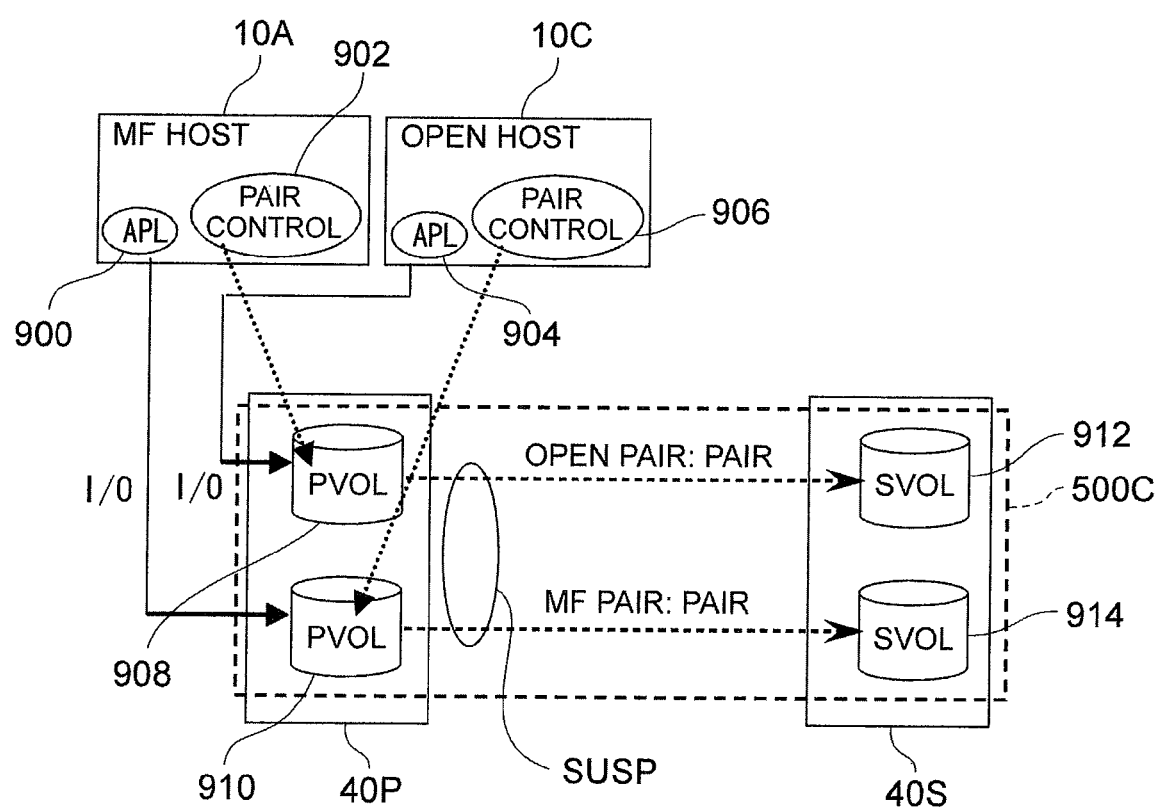
FIG. 16 is a block diagram showing that the maintenance backup is applied to the remote copy system in FIG. 9.

FIG. 16 is a block diagram showing that maintenance backup is applied to the remote copy system in FIG. 9. In FIG. 16, if suspend of the maintenance operation for the primary storage system 40P is required from at least the pair control program 906 of the open host 10C or the pair control program 902 of the mainframe host 10A, the pair operation program of the primary storage system sets the suspend status of the new CTG management table (FIG. 7) to "suspend being received" indicating the status in which suspend is received and not completed.

Next, the remote copy pair monitoring program of the primary storage system 40P or the I/O processing program of the mainframe host/open host refers to the suspend reception status (702) of the CTG management table (FIG. 7) and, if the status is "suspend being received," sets the pair status of the mainframe volume pair and the open volume pair belonging to the consistency group 500C of the attribute "common CTG" to "suspend."

Then, the remote copy monitoring program, when setting the pair status of all the volume pairs in this consistency group to "suspend," sets the pair status to "suspend not received."

During this period, the pair operation program performs the resynchronization processing for the suspended volume pairs and, if the secondary volumes (912, 914) are synchronized with the primary volumes (908, 910), restores the pair status of the volume pairs to "PAIR." In resynchronization, the pair operation program does not have to copy all the data in the primary volumes to the secondary volumes but has only to copy the difference of the volume pairs from the primary volumes after the suspend to the secondary volumes.

On the other hand, in backup processing in case of a failure in the remote copy system, the failure monitoring program of the primary storage system 40P, upon detecting the occurrence of a failure to the remote copy, for example, a failure in the path between the host device and the storage system, sets the suspend reception status of the consistency group 500C (FIG. 7: 702) to "suspend being received."

Next, the remote copy pair monitoring program or the I/O processing program of the mainframe host/open host refers to the suspend reception status of the CTG management table and, if the status is "suspend being received," sets the pair status of the mainframe volume pair and the open volume pair belonging to the consistency group 500C of the attribute "common CTG" to "suspend."

Subsequently, when the pair status of all the volume pairs in this consistency group is set to "suspend," the remote copy monitoring program sets the pair status to "suspend not received." During this period, the program performs resynchronization for the suspended volume pair.

Figure 18:
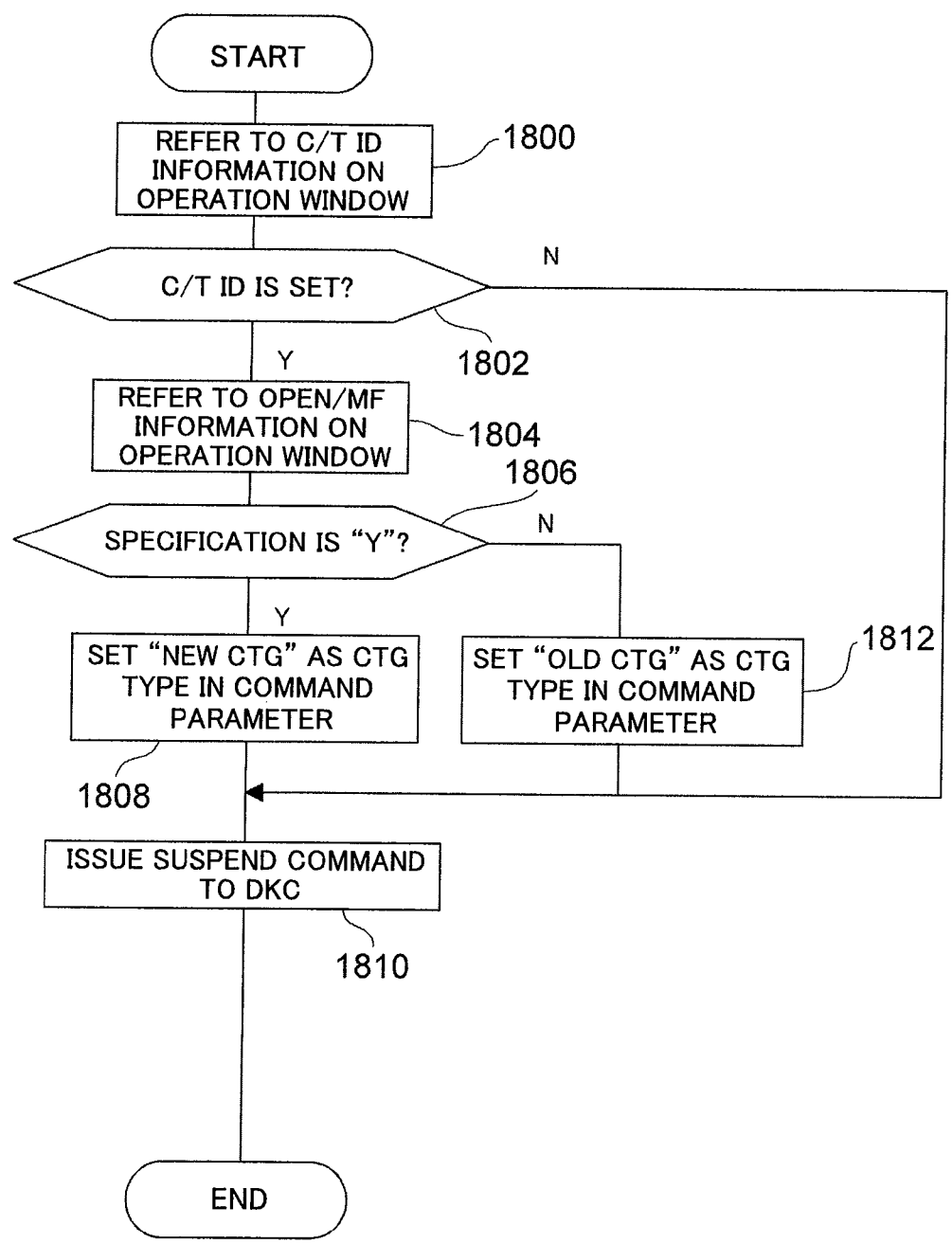
FIG. 18 is a flowchart showing the pair suspend processing of the pair operation program of the mainframe host.

The pair suspend processing is now described in detail. FIG. 18 is a flowchart showing the pair suspend processing of the pair control program of the mainframe host. The pair control program refers to the C/T ID information field (1) of the operation window (FIG. 11) (1800) and, upon determining that no C/T ID is set in this field ("NO" at step 1802), issues a suspend command to the DKC (primary storage system) (1810).

The program, upon determining that a C/T ID is set ("YES" at step 1802), refers to the OPEN/MF setting field (2) of the operation window (FIG. 11) (1804) and, upon determining that "Y" is specified in this field ("YES" at step 1806), sets the command parameter "CTG type" to "new CTG" (1808) or, upon obtaining a negative result in the determination at step 1806, sets the command parameter "CTG type" to "old CTG." Next, the pair operation program issues a suspend command to the DKC.

FIG. 19 is a flowchart describing the pair suspend processing by the pair control program of the open host, and FIG. 20 shows the information on the window for the remote copy pair suspend control by the pair control program of the open host.

The pair control program refers to the option information input in the operation window (1900), and checks whether "–g" is specified (1902). If this is determined to be affirmative, the program determines that the suspend target open volume is in the "new CTG" consistency group, and refers to the C/T ID information of the pair management table (1904).

Figures 26, 27:
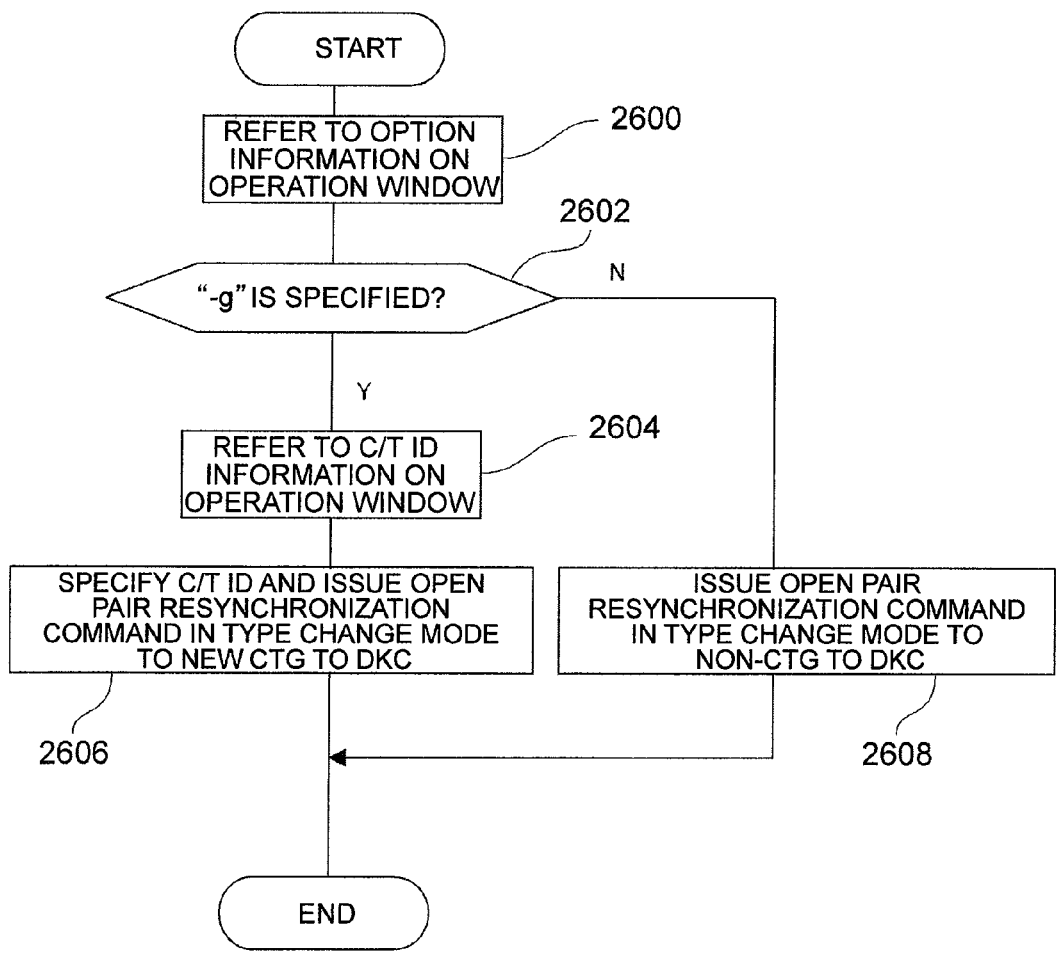
FIG. 26 is a flowchart describing the pair resynchronization processing of the pair operation program of the open host.
FIG. 27 is the window on which the configuration information is input for the resynchronization processing.

Then, the program specifies a C/T ID and issues a command for suspending the target volume in the mode for the consistency group of the "new CTG" attribute to the DKC (1906). On the other hand, upon determining that "–g" is not specified ("NO" at step 1902), the program issues a pair suspend command in the type change mode for the "non-CTG" to the DKC (1908). As for the type change mode, refer to FIG. 26 shown later.

The suspend command in the "new CTG mode," when suspending a volume pair belonging to the consistency group, enables pair suspend without stopping I/O from the host device to the primary storage system. On the contrary, a suspend command in the "old CTG mode," for maintaining the consistency of the consistency group until the resynchronization after the suspend of the volume pair, must stop I/O from the host device.

Figure 21:
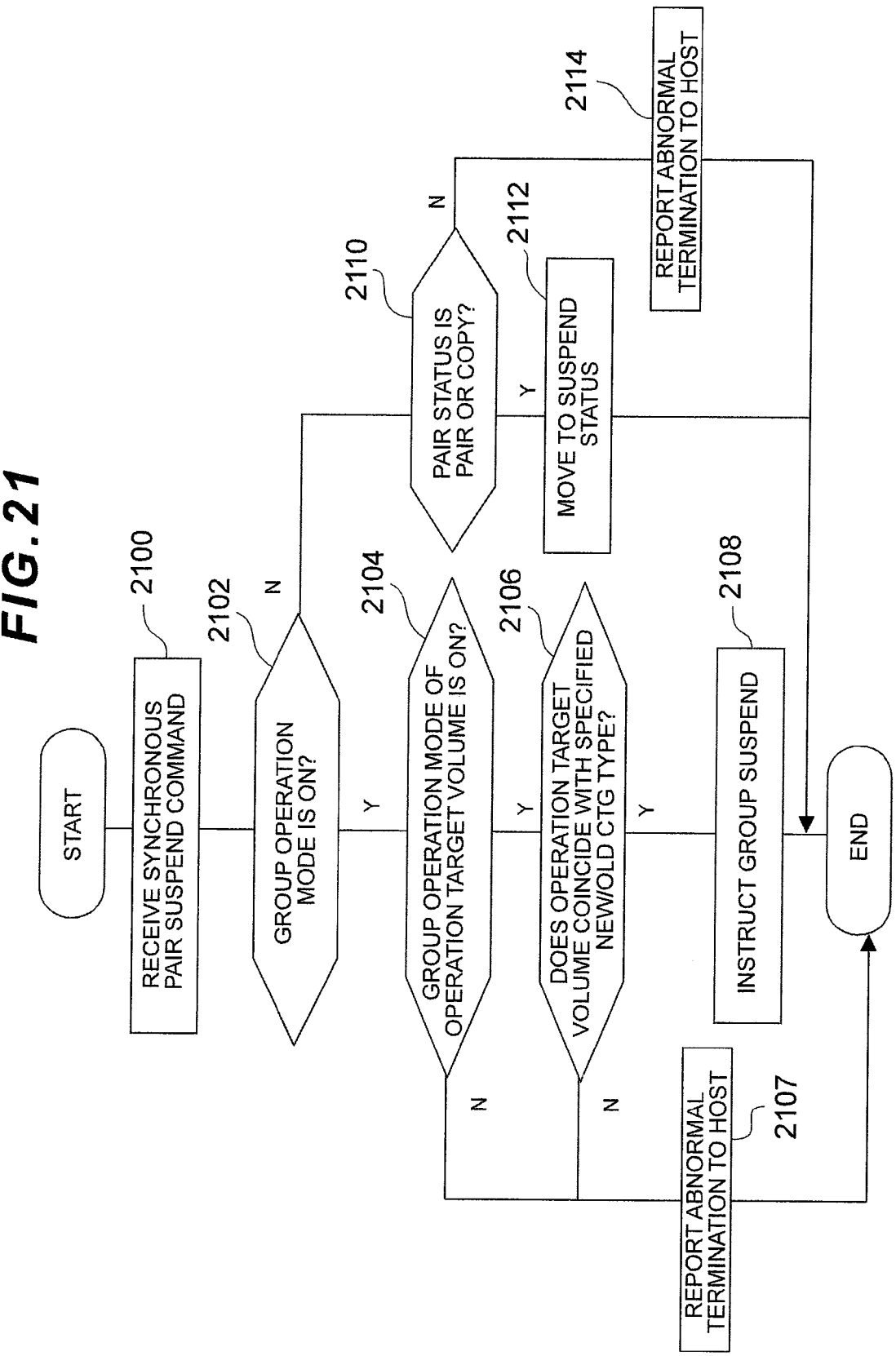
FIG. 21 is a flowchart showing the pair suspend processing by the pair operation program of the DKC.

FIG. 21 is a flowchart showing the pair suspend processing by the pair operation program of the DKC. The pair operation program of the DKC, upon receiving a synchronous pair suspend command from the host device (2100), checks the command parameters. In the command parameters, an operation target volume #, a copy type, a copy destination device #, a copy destination volume #, a group operation mode, a new/old CTG type, and a C/T ID are included.

The pair operation program, with reference to the command parameters, determines whether the group operation mode is "ON" (2102). The program, upon determining this to be negative, determines that it is not necessary to perform group suspend for a consistency group, that is, to suspend multiple volume pairs belonging to the consistency group at a time, and checks whether the pair status of the target volume is "PAIR" or "COPY" (2110).

The program, upon determining this to be affirmative, sets the target volume pair status (FIG. 6: 616) to "SUSP" and changes the target volume pair to the suspend status (2112). On the other hand, the program, upon determining that the pair status is not "PAIR" or "COPY" ("NO" at step 2110), as the target volumes are not a pair and pair suspend cannot be achieved, reports the abnormal termination of the suspend processing to the host device which issued the suspend command.

On the other hand, upon determining that the group operation mode is "ON" ("YES" at step 2102), the program refers to the CTG management table (FIG. 7) and checks the operation mode (FIG. 6: 610) for the operation target volume (2104).

Upon determining that the operation mode is "ON," with reference to the remote copy pair management table (FIG. 6), the program compares the new/old CTG type indicating whether the CTG specified by the command parameter is of a new type or of an old type with the new/old type (FIG. 6: 612) set in the management table for the target volume (2106) and, upon determining that they coincide, issues a group suspend command for suspending all the volume pairs in the consistency group classified as a "new CTG" to the pair status monitoring program (2108).

On the other hand, upon determining that steps 2104 and 2106 are respectively negative, as the information specified by the command parameter is not consistent with the management information registered to the management table, the pair operation program reports the abnormal termination to the host device (2107).

FIGS. 22A to 22E are flowcharts describing the pair suspend processing by the pair status monitoring program of the DKC.

The pair status monitoring program, upon receiving an operation pair suspend request from the host device or receiving a failure pair suspend request from the failure monitoring program (2200), checks whether the copy type of the volume as the target of the suspend request is synchronous copy with reference to the management table (FIG. 6) (2202). If this is determined to be negative, the processing is completed.

Upon determining this to be affirmative, the program checks whether the group operation mode of the target volume is "ON" with reference to the management table (FIG. 6: 610) (2204). If this is determined to be negative, the processing is completed.

Upon determining this to be affirmative, the program checks whether the consistency group to which the target volume belongs is classified as a "new CTG" with reference to the management table (FIG. 6: 612) (2206). Upon determining this to be affirmative, the program identifies the group ID from the management table (FIG. 6: 614) (2208), further refers to the management table (FIG. 7), and checks the "suspend reception status" (2210).

Upon determining this to be "suspend being received," as the suspend processing is applied to all the volumes in the group, the pair operation program completes the flowchart.

Upon determining this to be negative, the program sets the "pair suspend reception status" (FIG. 7: 702) to "suspend being received" (2212).

Figure 22A:
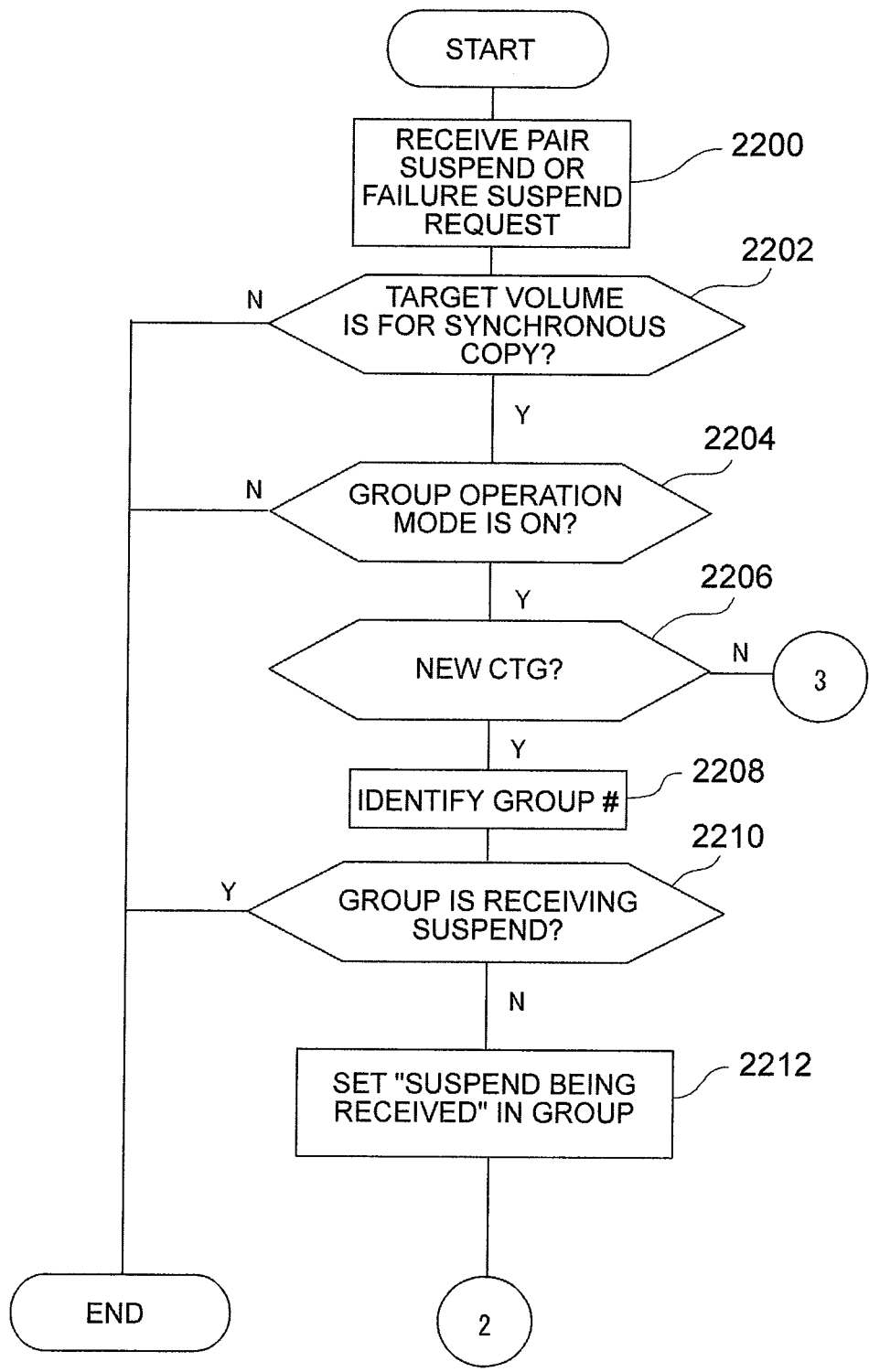
FIG. 22A is a flowchart describing the pair suspend processing by the pair status monitoring program of the DKC.
Figure 22B:
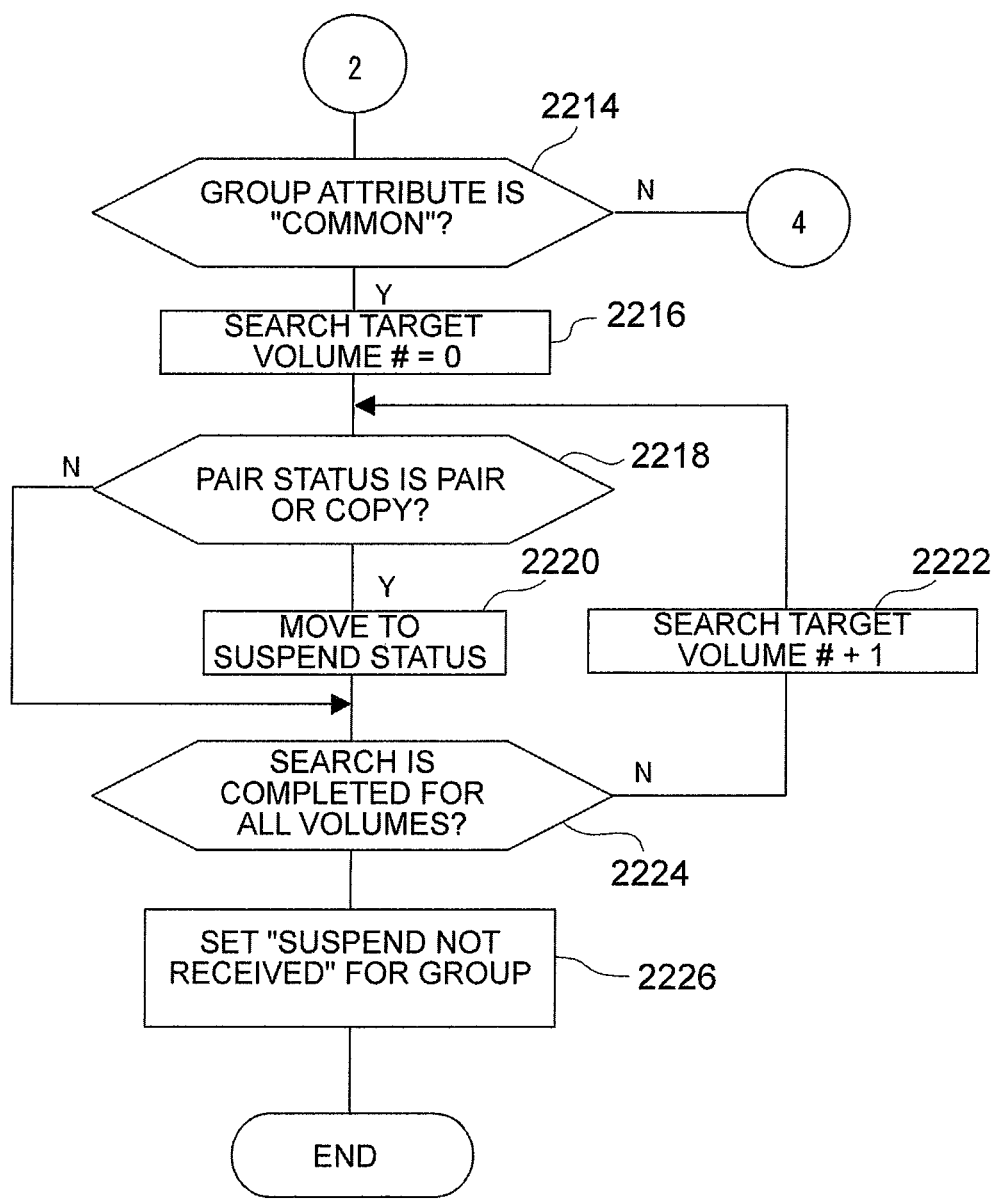
FIG. 22B is a flowchart related to the processing continued from FIG. 22A.
Figure 22C:
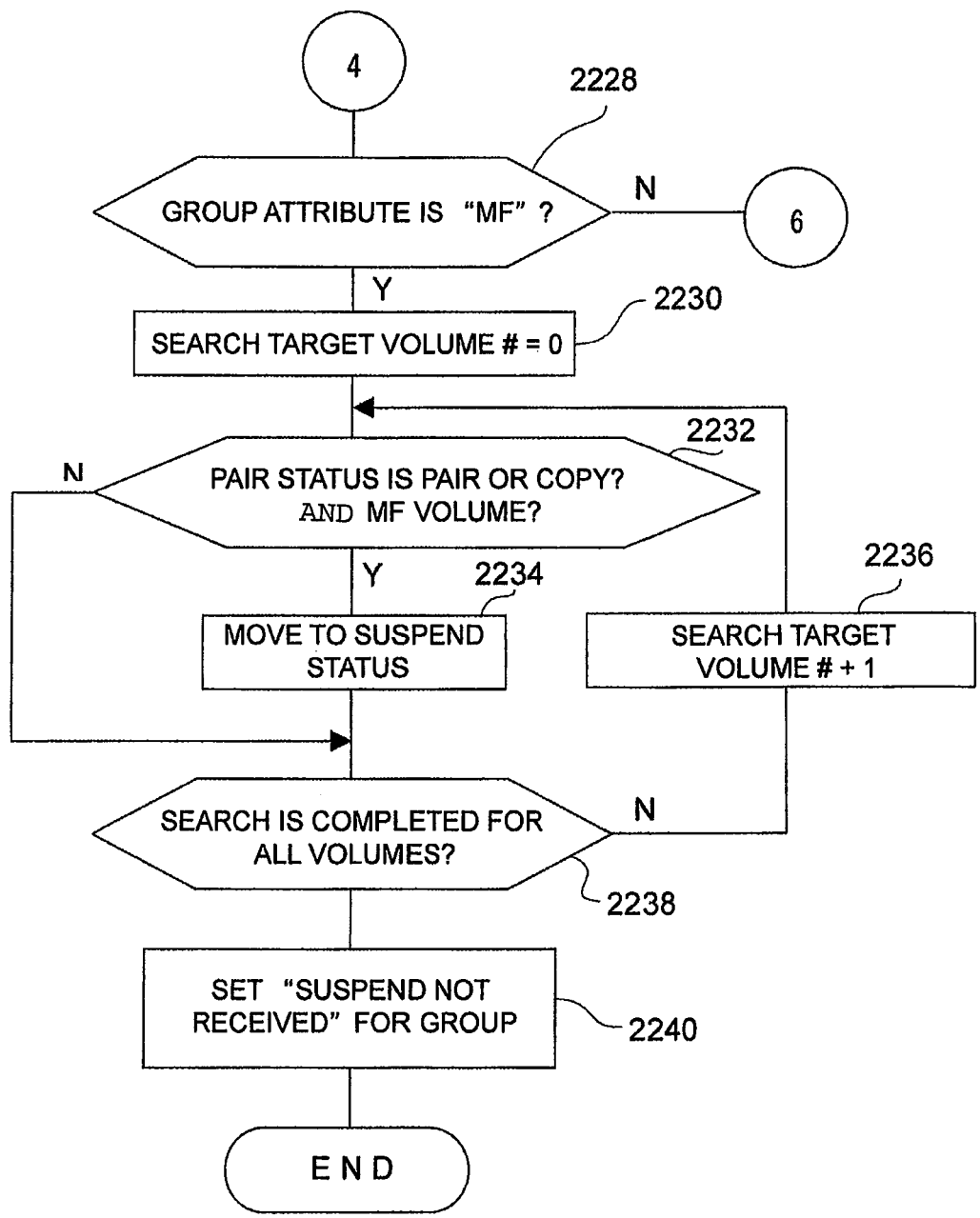
FIG. 22C is a flowchart related to the processing continued from FIG. 22B.
Figure 22D:
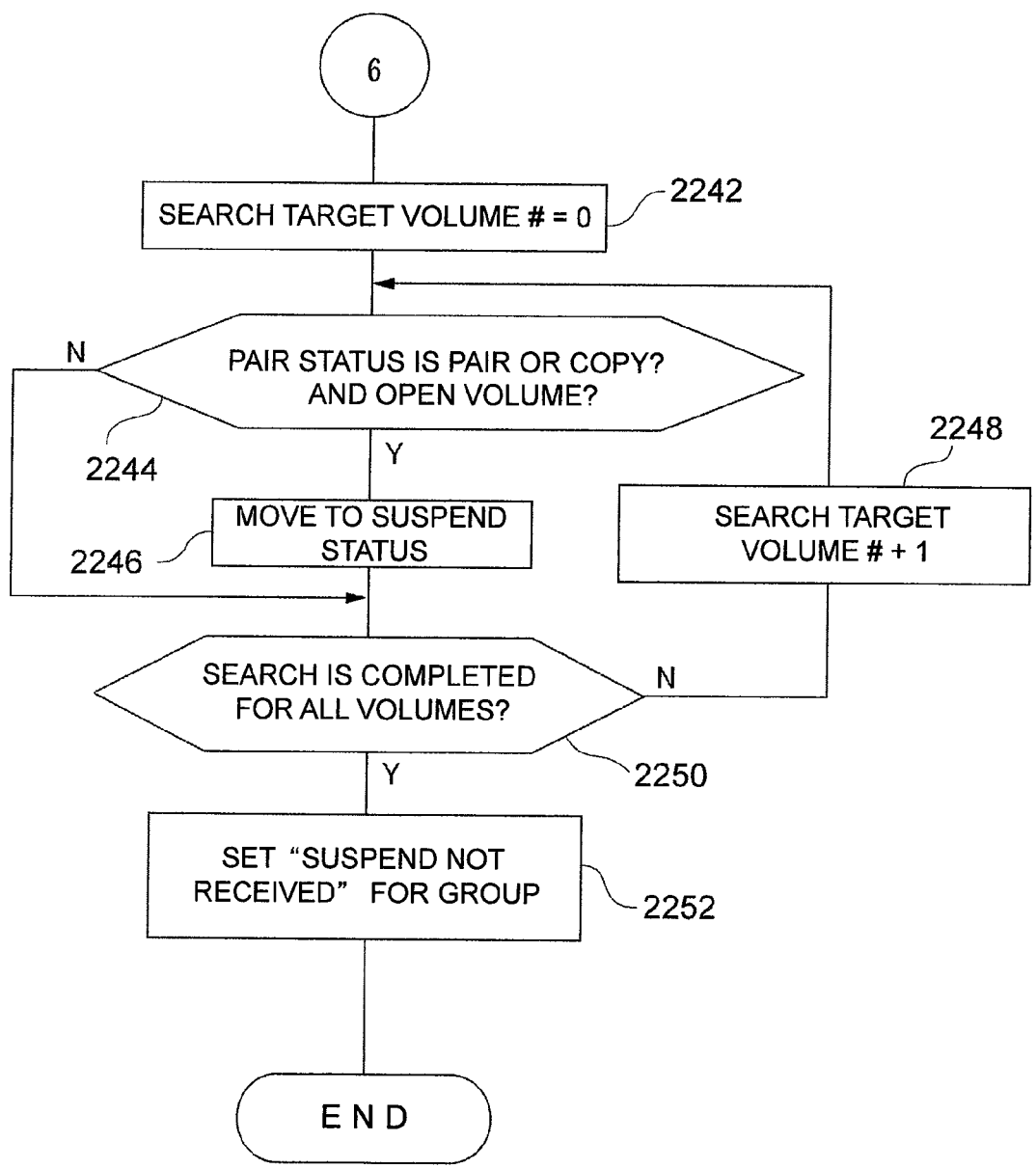
FIG. 22D is a flowchart related to the processing continued from FIG. 22C.
Figure 22E:
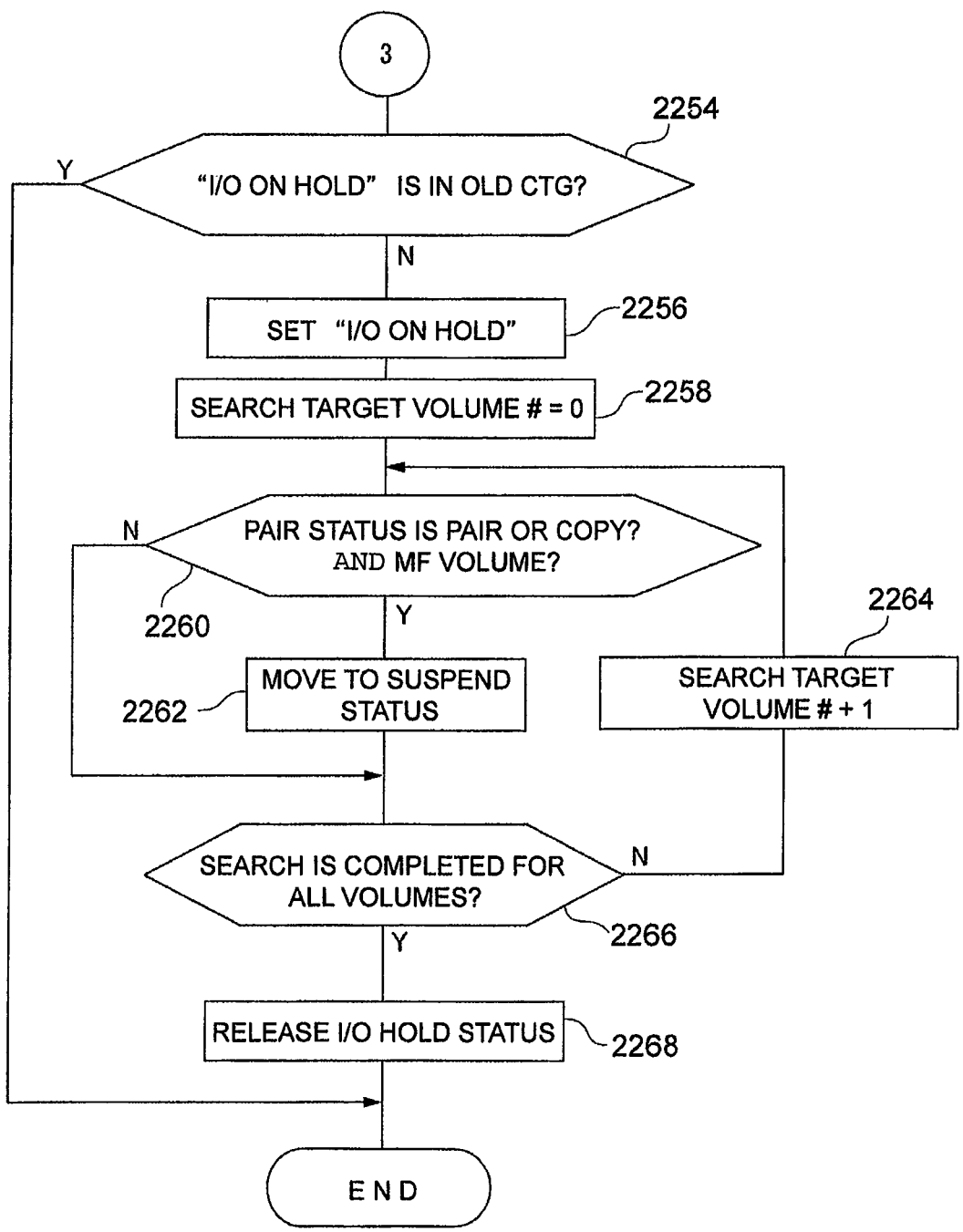
FIG. 22E is a flowchart related to the processing continued from FIG. 22D.

Upon determining that the group for the target volume is not a "new CTG," the pair status monitoring program proceeds to the processing in FIG. 22E.

Next, the pair status monitoring program proceeds to the flowchart in FIG. 22B, acquires the group attribute of the identified "new CTG" consistency group from the management table (FIG. 6 or FIG. 7) and, upon determining that the group attribute specified by the suspend command is "common CTG" (2214), for suspending all the volumes belonging to the identified group, performs search processing of the pair status for all the volumes.

Firstly, the program sets one volume in the group as the search target volume # (=0) (2216), and determines whether the pair status of this volume is "PAIR" or "COPY" or neither of the above with reference to the pair status in the management table (FIG. 6: 616) (2218). Upon determining this to be affirmative, the program changes the search target volume pair to the suspend status (2220).

Next, the program determines whether the search was completed for all the volumes (2224) and, upon determining this to be negative, adds "+1" to the search target volume # (2222), and repeats the search processing over the other target volumes.

When the search processing is completed for all the volumes, to the suspend reception status (FIG. 7: 702) of the identified consistency group, as the suspend processing for all the volumes is set or completed, the program registers "suspend not received" (2226), and completes the flowchart. Note that, if the determination of whether the group attribute is "common" (2214) is negative, the program proceeds to the processing in FIG. 22C.

The pair status monitoring program, proceeding to the processing in FIG. 22C, determines whether the group attribute is "MF" (2228) and, if this is affirmed, for all the volumes in the group, performs the same search processing as in FIG. 22B (2230 to 2236) and, when completing the search processing for all the volumes (2238), completes the flowchart by setting the "suspend reception status" (FIG. 7: 702) to "suspend not received" (2240). On the other hand, upon determining that the group attribute is not "MF," the pair status monitoring program proceeds to the flowchart in FIG. 22D.

The pair status monitoring program, proceeding to the processing in FIG. 22D, determines that the group attribute of the consistency group with the ID identified at step 2208 is "OPEN," performs the same search processing as in FIG. 22C for all the volumes in the group (2242 to 2248) and, when determining the completion of this processing (step 2250), sets the suspend reception status of the identified consistency group to "suspend not received" (2252), and completes the flowchart.

The pair status monitoring program, in the processing in FIG. 22A (2206), upon determining that the group is not a "new CTG," for assuring the consistency of the copy group, until the volume pair is suspended, holds the processing for I/O from the host. FIG. 22E is the flowchart for that part.

The pair status monitoring program, for the "old MF CTG" which is the consistency group not corresponding to the "new CTG," refers to the management table in FIG. 8, checks the "I/O hold status" (800), and determines whether the status is "I/O on hold" (2254). Upon determining this to be affirmative, the program completes the flowchart.

On the contrary, if I/O is determined not to be on hold, the program sets "I/O on hold" in the I/O hold status (800) of the management table in FIG. 8 (2256) and, for changing all the volumes belonging to the consistency group to the suspend status, performs the search processing for all the volumes (2258 to 2264).

Then, the pair status monitoring program, when completing the suspend for all the volume pairs belonging to the consistency group (2266), for releasing the I/O hold status (2268), sets "I/O hold not performed" in the management table (FIG. 8: 800) and resumes the I/O processing.

According to FIG. 22E, the pair status monitoring program, for the remote copy system to assure the consistency at the time of pair suspend for the consistency group of the old type, must terminate the I/O processing while the consistency group classified as a "new CTG" assures the consistency at the time of pair suspend without terminating the I/O processing.

Figure 23:
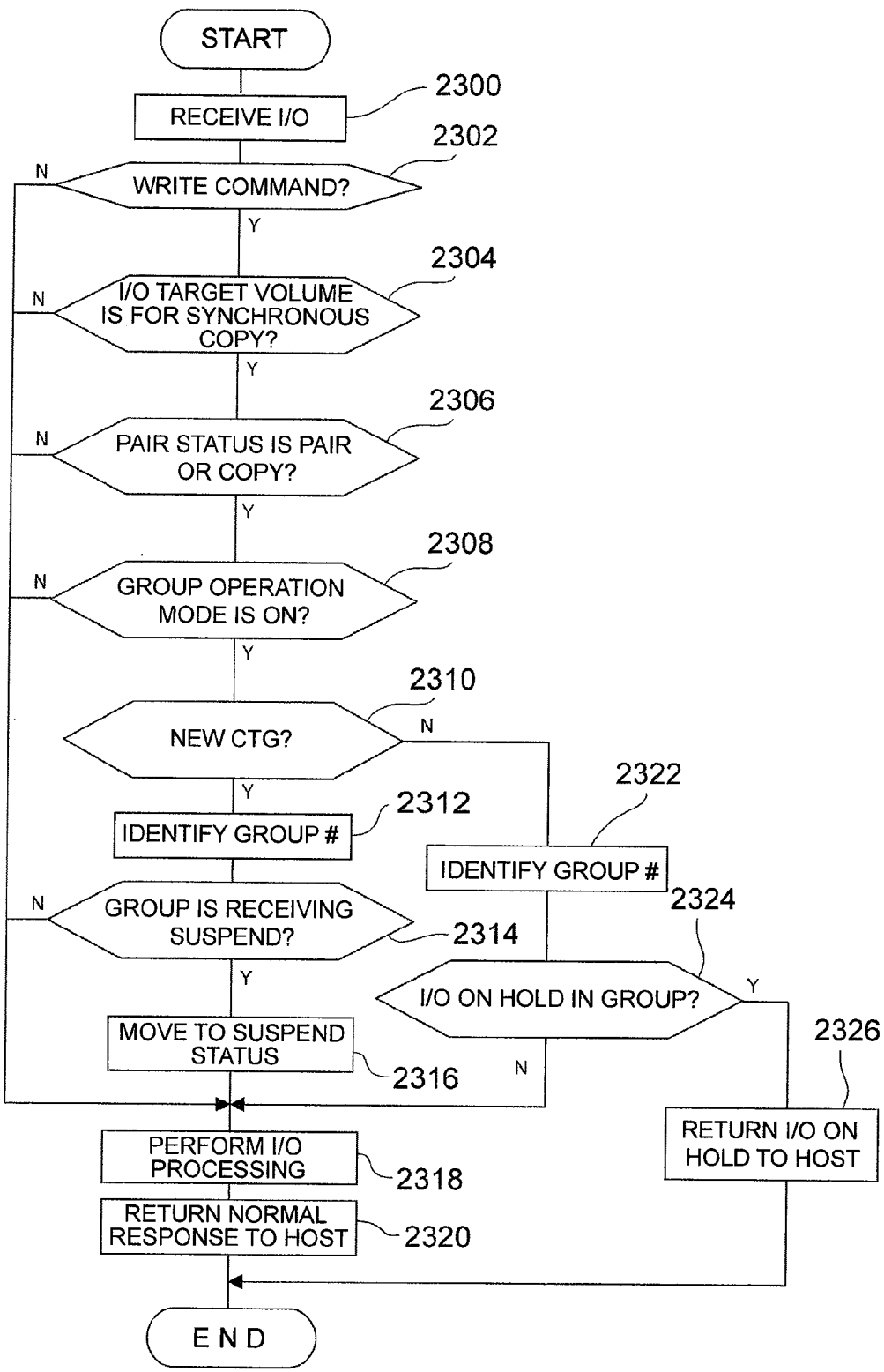
FIG. 23 is a flowchart showing the operation of the I/O processing program of the primary storage system.

FIG. 23 is the processing for achieving this and a flowchart showing the operation of the I/O processing program of the primary storage system. The I/O processing program, upon receiving I/O from the host device (2300), determines whether this is a write command (2302) and, upon determining that this is a read command or the like and not a write command, as the assurance of the consistency is not affected, performs the I/O processing (2318), and returns a normal response to the host device (2320).

On the other hand, if the I/O is determined to be a write command, the program refers to the management table (FIG. 6) for the I/O target volume, and checks the copy type (2304). If the copy type is not synchronous copy, the program performs the I/O processing (2318) or, if it is synchronous copy, further refers to the management table (FIG. 6) to determine whether the pair status of the I/O target volume is "COPY" or "PAIR" or neither of the above (2306).

Upon determining this to be affirmative, the program further checks whether the group operation mode is "ON" (2308). If the check of the pair status and the check of the group operation mode are determined to be negative, considering that the assurance of the consistency is not required, the program performs the I/O processing (2318).

If the group operation mode is determined to be "ON," the program checks the group attribute of the target volume and determines whether it is a new CTG, that is, whether it is any one of "MF," "OPEN," and "common" (2310).

If this is affirmed, the program identifies the group ID of the consistency group (2312), and further refers to the management table (FIG. 7) to check whether the suspend reception status of the identified group is "suspend being received" (2314).

Upon determining that the status is "suspend being received," the I/O processing program determines that the pair status monitoring program does not complete the suspend for all the volume pairs belonging to the identified group, sets the pair status of the I/O target volume (FIG. 6) to suspend "SUSP," changes the target volume pair to the suspend status (2316), and performs the I/O processing (2318).

As mentioned above, as the I/O processing program, even upon receiving I/O, does not perform the I/O processing until changing the target volume pairs to the suspend status, in that period, the remote copy program does not perform remote copy synchronized with I/O for the secondary volumes.

Therefore, the I/O processing program can, without terminating or holding the I/O processing, maintain the assurance of the consistency at the time of the suspend for the volume pair while continuing the I/O processing.

On the contrary, if the group attribute of the consistency group is "old MF" ("NO" at step 2310), the I/O processing program, after identifying the consistency group ID (2322), refers to the management table in FIG. 8 and determines whether the "I/O hold status" is "I/O on hold" (2324). If I/O is determined to be on hold, the I/O processing program returns "I/O on hold" to the host (2326). The host device, receiving this response, terminates the I/O request. If "I/O on hold" is negated ("NO" at step 2324), the program performs the I/O processing (2318).

FIG. 17A shows a timing chart of the control processing performed by the pair status monitoring program and the I/O processing program of the primary storage system for "pair suspend received" (FIG. 23: "YES" at step 2314). On the other hand, FIG. 17B is a timing chart, corresponding with FIG. 17A, showing the condition of the remote copy between the primary volumes and the secondary volumes, wherein 908 are open primary volumes, 910 are mainframe primary volumes, 912 are open secondary volumes, and 914 are mainframe secondary volumes.

In FIG. 17A, the volume PAIR #1 to PAIR #6 are allocated to the consistency group 500C with the attribute "common." To each PAIR #, at the time of being shown in the figure, if a suspend command is issued from the host to at least one volume pair belonging to the consistency group, the pair status monitoring program (FIG. 22B) performs step 2214 to step 2226, and sequentially suspends all the volume pairs in the consistency group.

On the other hand, for all the volume pairs belonging to the consistency group, before the suspend by the pair status management program is completed, even if I/O is required to the volume for which the suspend is not completed, the I/O processing program (FIG. 23) performs steps 2314 to 2318, suspends the volume pair independently of the pair monitoring program, and then performs the I/O processing for the primary volume.

Therefore, as shown in FIG. 17B, the I/O processing program, after the time (T) when the suspend is instructed, for all the secondary volumes belonging to the consistency group, for assuring that the data 970 written to the primary volume will not be copied to the secondary volume, for all the secondary volumes belonging to the consistency group, assures the user of the consistency at the time (T) when the suspend is instructed.

Next, the processing for resynchronizing suspended volume pairs is described. Note that, as mentioned above, adding volume pairs to the consistency group classified as a "new CTG" and changing the attribute of the consistency group can be achieved by suspending and resynchronizing volume pairs. Therefore, to the resynchronization processing, changing the group attribute of the new CTG, i.e., the processing related to changing the CTG type is added.

Figure 24:
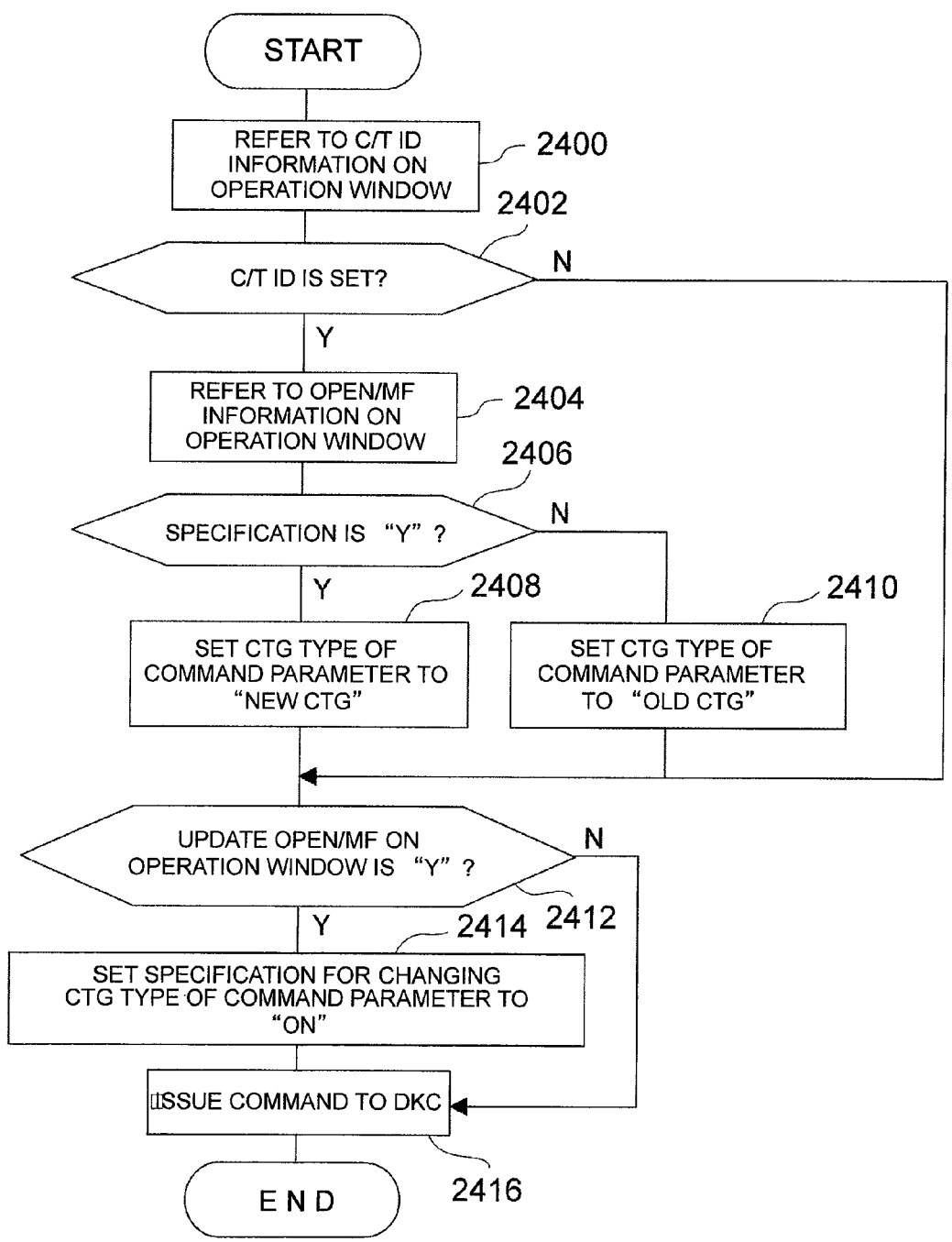
FIG. 24 is a flowchart describing the resynchronization processing of the pair operation program of the mainframe host.

FIG. 24 is a flowchart describing the resynchronization processing of the pair control program of the mainframe host. FIG. 25 is a block diagram of the display window (mainframe host) for the resynchronization processing. The pair control program refers to the C/T ID information (1) of the operation window for pair creation (FIG. 11) (2400) and determines whether the C/T ID is set (2402).

Upon determining this to be affirmative, the program refers to the specified value in the OPEN/MF information field (2) on the same operation window (2404) and, if the specified information is "Y" (2406), sets the group attribute of the command parameter to "new CTG" (2408) or, if not "Y," sets the attribute to "old CTG" (2410).

Next, the pair control program refers to the Update OPEN/MF information (1) in the operation window in FIG. 25 (2412) and determines whether this is "Y." If it is "Y," for changing the attribute of the consistency group to which the volume pair to be resynchronized belongs, the program sets the information specified for changing the CTG type of the command parameter to "ON" (2414), and issues a resynchronization command to the DKC (2416).

Upon determining that "Y" is not specified for the Update OPEN/MF information (1) ("N" at step 2412), as it is not necessary to change the attribute of the consistency group, the program immediately issues a resynchronization command to the DKC (2416). Note that, if no C/T ID is specified ("N" at step 2402), the program jumps to the processing for determining whether to change the consistency group attribute (2412).

FIG. 26 is a flowchart describing the pair resynchronization processing of the pair control program of the open host. FIG. 27 is the window on which the configuration information is input for the resynchronization processing. The pair control program refers to the option information in the operation window (2600) and checks whether "-g" is specified (2602).

Upon determining this to be affirmative, the program refers to the C/T ID in the operation window (2604), specifies this C/T ID, and issues a command for resynchronizing the open volume pair in the mode of changing the group attribute of the new CTG to the DKC (2606).

On the other hand, the pair control program, upon determining it is negative that "-g" is specified in the option information in the operation window ("N" at step 2602), issues a synchronous command in the mode of changing the consistency group to the attribute of non-CTG to the DKC (2608).

Figure 28A:
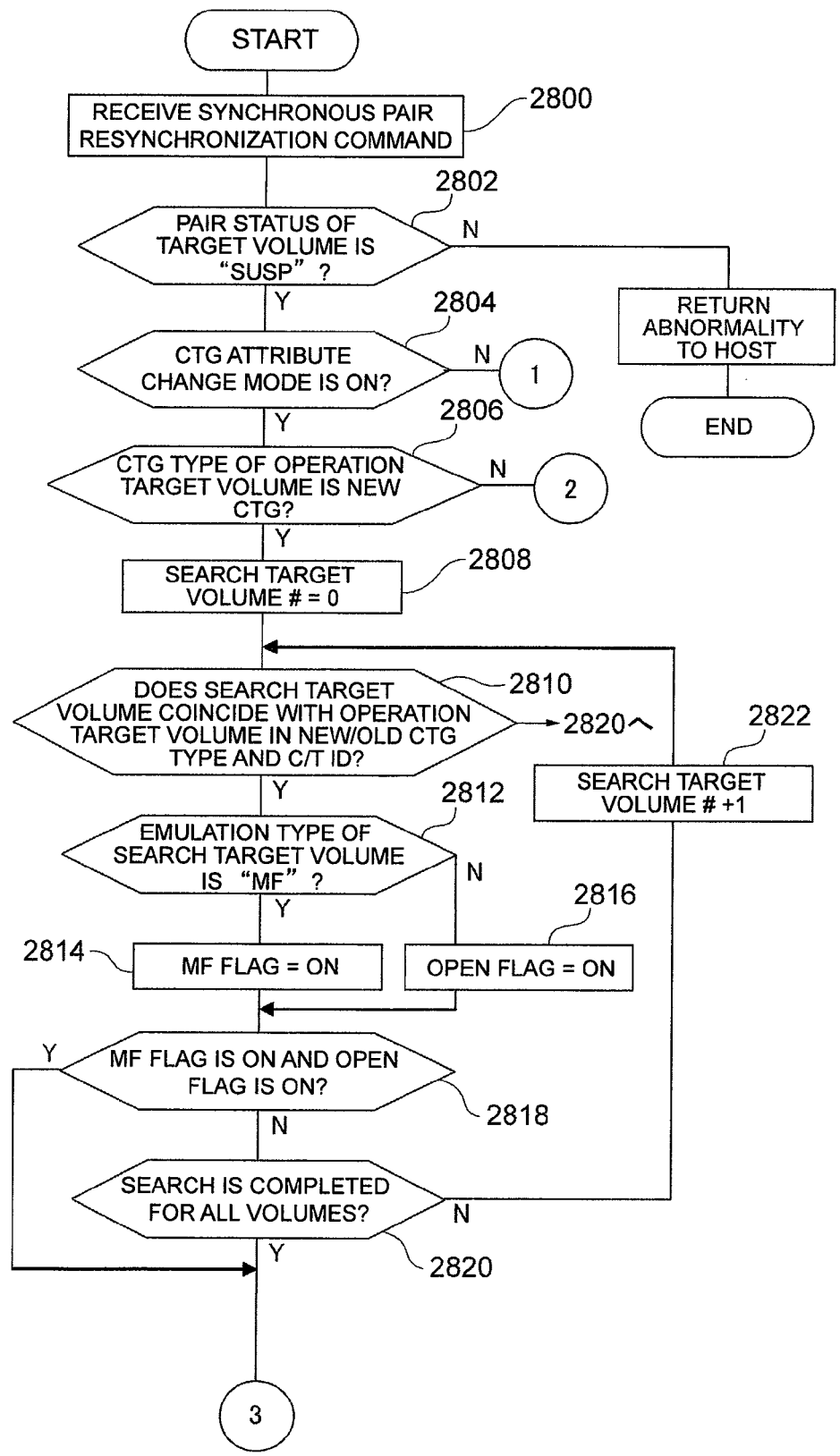
FIG. 28A is a flowchart describing the pair resynchronization processing of the pair operation program of the DKC.
Figure 28B:
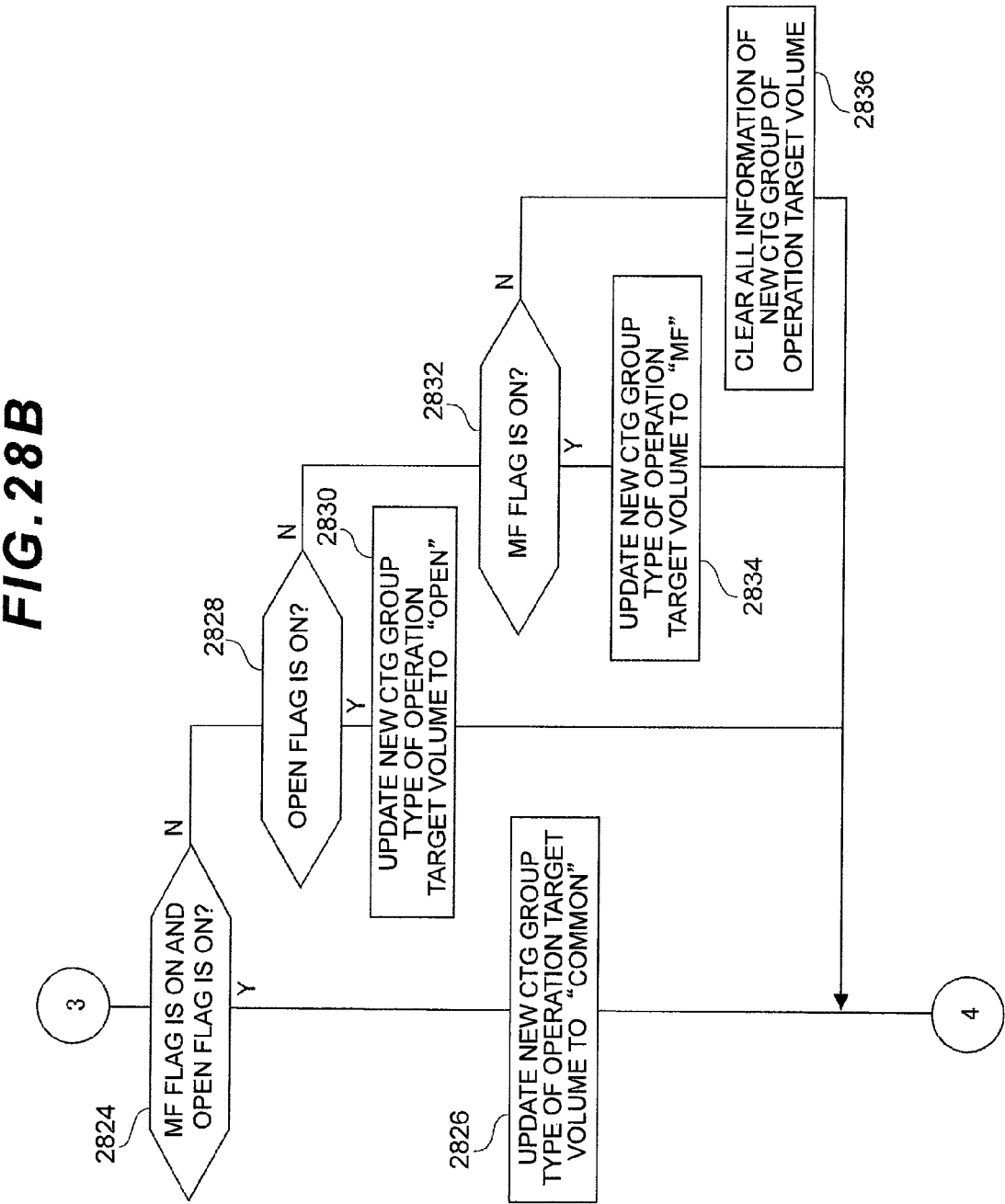
FIG. 28B is a flowchart related to the processing continued from FIG. 28A.
Figure 28C:
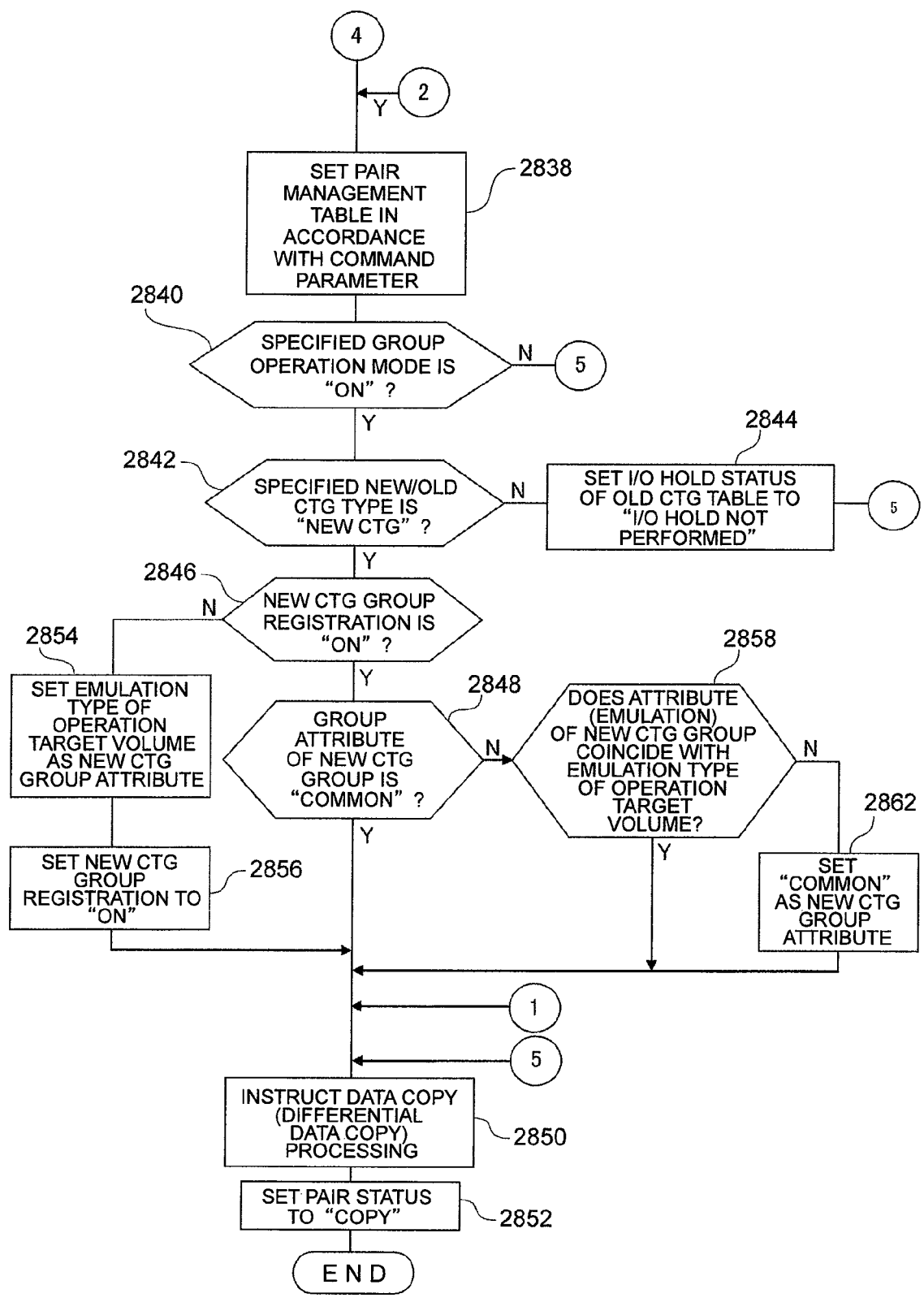
FIG. 28C is a flowchart related to the processing continued from FIG. 28B.

The pair control program of the open host, not comprising the function of supporting the update of the CTG type unlike the pair control program of the mainframe host, issues a resynchronization command in the mode of changing the CTG attribute (type) to the DKC. FIGS. 28A to 28C are flowcharts describing the pair resynchronization processing of the pair operation program of the DKC. The pair operation program, upon receiving a volume pair resynchronization command from the host (2800), refers to the contents of the command parameters and checks the status of the target volume pairs of the resynchronization processing with reference to the management table (FIG. 6). In the command parameters, an operation target volume #, a copy type, a copy destination device #, a copy destination volume #, a group operation mode, a new/old CTG type, a CTG type change mode, and a C/T ID are included.

The pair operation program, upon determining that the pair status of the target volume is "SUSP" (2802), determines whether the mode of changing the attribute and the type of the consistency group which is the target of the resynchronization processing is "ON" (2804). The necessity for changing the attribute and the type of the consistency group arises when migrating a volume pair from a copy group/consistency group to another group. Note that the pair operation program, for pair resynchronization commands from the open host, always determines step 2804 to be affirmative.

Upon determining this to be affirmative, the program determines whether the attribute of the CTG of the operation target volume of the resynchronization processing is new CTG (2806).

Upon determining this to be affirmative, the pair operation program performs the processing for changing the group type (FIG. 6, FIG. 7: 612) after the target volume pair is removed from the "new CTG" consistency group. As the "new CTG" attribute is determined by the emulation types of the volumes included in this, for all the volumes except for the target volume, the search processing for the emulation types is performed.

The pair operation program selects a volume # (=0) as a search target (2808), and then, with reference to the management table (FIG. 6 or FIG. 7), determines whether the search target volume and the volume specified as the operation target by the command parameter coincide in the new/old CTG type and the C/T ID(2810).

Upon determining this to be affirmative, as it might be necessary to change the attribute of the consistency group to which the search target volume belongs, the program checks the emulation type of the search target volume with reference to the management table (FIG. 6).

If the emulation type is determined to be "MF" (2812), the program sets the MF flag existing in a specified area of the shared memory to "ON" (2814) or, on the other hand, if the emulation type is determined not to be "MF," as the search target volume is open, sets the OPEN flag to "ON" (2816).

Next, the pair operation program checks the MF flag and the OPEN flag to determine whether both of the flags are "ON" (2818) and, upon determining this to be affirmative, as the attribute of the C/T ID for the target volume is decided to be "common CTG," no further search processing is required.

On the other hand, upon determining this to be negative (2818), the program checks whether the search for all the volumes registered to the management table (FIG. 6) is completed (2820) and, upon determining this to be affirmative, completes the search processing. Upon determining this to be negative, for searching the next volume, the program adds "+1" to the search target volume # (2822).

On the other hand, upon determining that the new/old CTG type and the C/T ID of the search target volume do not coincide with those of the operation target volume ("N" at step 2810), as the attribute of the C/T ID for the target volume does not have to be changed, the program jumps to the processing for determining the necessity of the search for the next volume (2820).

Note that, if the determination of whether the CTG group operation mode is "ON" (2804) is negated, the pair operation program proceeds to the processing in FIG. 28C. Furthermore, if the determination of whether the CTG type of the operation target volume is "new CTG" (2806) is negated, similarly, the program proceeds to the processing in FIG. 28C.

The pair operation program, when completing the search processing for the volume, proceeds to the flowchart in FIG. 28B. The pair operation program checks the MF flag and the OPEN flag to determine whether both of the flags are "ON" (2824) and, upon determining this to be affirmative, updates the group type related to the "new CTG" of the operation target volume to "common" (2826). On the other hand, upon determining this to be negative, the program determines whether the OPEN flag is "ON" (2828).

Upon determining this to be affirmative, the program updates the group type related to the "new CTG" of the operation target volume to "OPEN" (2830). On the other hand, upon determining this to be negative, the program determines whether the MF flag is "ON" (2832) and, upon determining this to be affirmative, updates the group type related to the "new CTG" of the operation target volume to "MF" (2834).

On the other hand, the pair operation program, upon determining this processing to be negative, as neither an open volume nor a mainframe volume exists but the operation target volume in the "new CTG" of the operation target volume, for the consistency group of the operation target volume, clears all the information. Next, the pair operation program proceeds to the processing in FIG. 28C, and changes the attribute of the consistency group where the volume pair as the operation target is resynchronized.

The pair operation program, with reference to the command parameter, sets the information in the pair management table (FIG. 6) (2838). However, the group attribute and the pair status are set by the following steps.

Next, the program checks whether the group operation mode of the command parameter is set to "ON" (2840). Upon determining this to be affirmative, the program further determines whether the attribute of the consistency group of the command parameter is set to "new CTG" (2842).

Upon determining this to be affirmative, the program checks whether the group registration of the "new CTG" group with this C/T ID specified by the command parameter is "ON" with reference to the management table (FIG. 7: 700) (2846).

Upon determining this to be affirmative, the program determines whether the attribute of the "new CTG" group with this C/T ID is "common" with reference to the management table (FIG. 7: 612) (2848).

If the attribute is determined to be "common," as the group attribute is not changed even if the target volume pair is added to this consistency group, the pair operation program instructs the pair status monitoring program to copy differential data from the primary volume to the secondary volume (2850), sets "COPY" in the pair status (FIG. 6: 616) of the target volume pair (2852), and completes the resynchronization processing.

On the other hand, upon determining the attribute of the consistency group not to be "common" ("NO" at step 2848), as the group attribute is changed by adding the target volume to the consistency group, the program compares the group attribute of the "new CTG" with the emulation type of the operation target volume (2858). Upon determining these to coincide, the program maintains the attribute of the group classified as a "new CTG" (2860).

Upon determining these not to coincide, as the volumes of emulation types "MF" and "OPEN" are mixed in the "new CTG" group, the program sets the group attribute to "common" (2862).

On the other hand, upon determining that the group registration of the "new CTG" group in the management table (FIG. 7: 700) is not set to "ON" ("NO" at step 2846), the program sets the emulation type of the operation target volume as the group attribute of this group (2854), and then sets the group registration to "ON" (2856).

Furthermore, the pair operation program, upon determining that the CTG type specified by the resynchronization command is "old CTG" ("N" at step 2842), sets the "I/O hold status" (800) in the management table (FIG. 8) of the old CTG group specified by the resynchronization command to "I/O hold not performed" (2844), cancels the I/O hold status, and jumps to step 2850 to perform the resynchronization processing. On the other hand, the procedure is the same if the operation mode of the group specified by the resynchronization command is determined not to be "ON."

Figure 29:
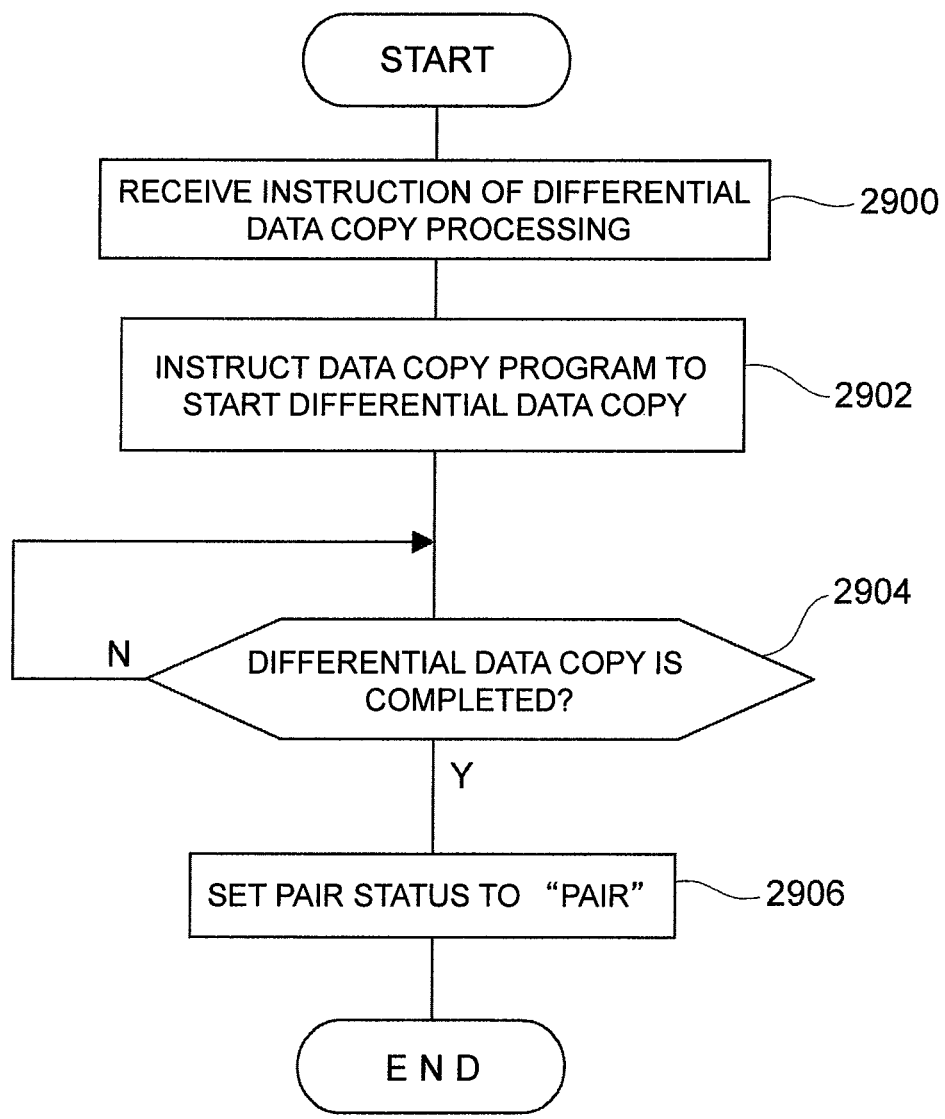
FIG. 29 is a flowchart showing the processing of the pair status monitoring program of the DKC.

FIG. 29 is a flowchart showing the processing of the pair status monitoring program of the DKC. The pair status management program, upon receiving a command for copying differential data from the pair operation program (2900), instructs the data copy program to start the copy of the differential data (2902).

The pair status monitoring program checks the completion of differential data copy (2904) and, when the differential data copy is completed, sets "pair status" (FIG. 6: 616) to "PAIR," and completes the processing.

In the above-mentioned embodiment, in accordance with commands from the pair control program of the host, the DKC performs the processing of pair creation, pair suspend, and pair resynchronization while the DKC may also perform the above-mentioned processing in accordance with commands from the management devices such as the management terminal 250.

Furthermore, though the above-mentioned embodiment describes synchronous remote copy, it is also possible to apply this invention to asynchronous remote copy.

The above-mentioned embodiment is merely explanatory for this invention and the scope of the invention is not limited to this embodiment. Those skilled in the art may appropriately modify the above-mentioned embodiment.

REFERENCE SIGNS LIST

1A Local site
1B Remote site
10A Mainframe host
10B Open host
40P Primary storage system
40S Secondary storage system

The invention claimed is:

1. A remote copy control method of a remote copy system including a first storage system and a second storage system, the remote copy control method comprising:
setting a primary volume in the first storage system;
setting a secondary volume in the second storage system, where the secondary volume forms a first copy pair with the primary volume; and
registering the first copy pair to a first consistency group,
wherein when changing the first copy pair from the first consistency group to a second consistency group, the remote copy system executes:
suspending the first copy pair; and
registering the first copy pair in the second consistency group instead of the first consistency group when resynchronizing the suspended first copy pair.

2. The remote copy control method according to claim 1, wherein an open host and a mainframe host are respectively coupled as the host to the first storage system, the first storage system includes a mainframe type first primary volume and an open type second primary volume, and the second storage system includes a mainframe type first secondary volume and an open type second secondary volume,
wherein the remote copy system executes:
creating the first copy pair configured from the first primary volume as the primary volume and the first secondary volume as the secondary volume,
creating a second copy pair configured from the second primary volume and the second secondary volume,
respectively registering the first copy pair to the first consistency group and the second copy pair to a different consistency group,
suspending the first copy pair,
suspending the second copy pair,
setting the suspended first copy pair and the suspended second copy pair in a common consistency group,
resynchronizing the first primary volume and the first secondary volume of the first copy pair, and
resynchronizing the second primary volume and the second secondary volume of the second copy pair.

3. The remote copy control method according to claim 1, wherein an open host and a mainframe host are respectively coupled as the host to the first storage system, the first storage system includes a mainframe type first primary volume and an open type second primary volume, and the second storage system includes a mainframe type first secondary volume and an open type second secondary volume,
wherein the remote copy system executes:
setting the first copy pair configured from the first primary volume and the first secondary volume in a first consistency group,
setting a second copy pair configured from the second primary volume and second secondary volume in the second consistency group,
suspending the first copy pair,
setting the suspended first copy pair in the second consistency group, and
resynchronizing the first primary volume and the first secondary volume of the first copy pair.

4. The remote copy control method according to claim 1, wherein the resynchronizing includes copying differential data, which was written from the host into the primary volume after the suspension, from the primary volume to the secondary volume.

5. The remote copy control method according to claim 1, wherein an open host and a mainframe host are respectively coupled as the host to the first storage system,
wherein the remote copy system includes an open type first consistency group to which an open volume pair is set, and a mainframe type second consistency group to which a mainframe volume pair is set, and
the remote copy system executes:
suspending the mainframe volume pair and setting the mainframe volume pair in the first consistency group, and changing an attribute of the first consistency group to a type which combines a mainframe volume pair and an open volume pair.

6. The remote copy control method according to claim 1, wherein, when an I/O processing program of the first storage system receives an I/O from the host, the I/O processing program suspends the first copy pair and thereafter executes write processing based on the I/O to the primary volume.

7. A remote copy system including a first storage system and a second storage system, comprising:
a primary volume set in the first storage system;
a secondary volume set in the second storage system;
a volume pair configured from the primary volume and the secondary volume; and
a controller including an I/O control unit and configured to register the volume pair to a first consistency group;
wherein when changing the volume pair from the first consistency group to a second consistency group, the controller is further configured to:
suspend the volume pair; and
register the volume pair in the second consistency group instead of the first consistency group when resynchronizing the suspended volume pair,
wherein the I/O control unit processes an I/O from a host to the primary volume,
wherein, if there is a request of the I/O to the suspended volume pair, the I/O control unit performs the I/O to the primary volume of the suspended volume pair.

8. The remote copy system according to claim 7,
wherein, if the I/O control unit determines that the volume pair is to be suspended and a request of the I/O was given during a period that suspending the volume pair has not been started, the I/O control unit suspends the volume pair and thereafter performs the I/O to a primary volume of the volume pair.

9. The remote copy system according to claim 7, further including a first volume pair and a second volume pair respectively configured from a pair of the primary volume and the secondary volume,
wherein the controller is further configured to:
set the first volume pair in a first consistency group and set the second volume pair in a second consistency group, and
wherein, if the I/O control unit determines that the first volume pair is to be suspended and a request of the I/O was given during a period that suspending the first volume pair has not been started, the I/O control unit suspends the first volume pair and thereafter performs the I/O to a primary volume of the first volume pair, and returns to the host a reply of holding the I/O processing to the second volume pair until the second volume pair is suspended.

10. The remote copy system according to claim 7, wherein the controller is configured to:

remote copy data of the primary volume to the secondary volume.

* * * * *